United States Patent
Kano

(10) Patent No.: US 8,942,238 B2
(45) Date of Patent: Jan. 27, 2015

(54) APPARATUS AND METHOD FOR ESTABLISHING TUNNELS BETWEEN NODES IN A COMMUNICATION NETWORK

(75) Inventor: Shinya Kano, Inagi (JP)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 13/599,050

(22) Filed: Aug. 30, 2012

(65) Prior Publication Data
US 2013/0058345 A1  Mar. 7, 2013

(30) Foreign Application Priority Data

Sep. 1, 2011 (JP) ................................. 2011-190822
Aug. 22, 2012 (JP) ................................. 2012-183081

(51) Int. Cl.
H04L 12/28 (2006.01)
H04L 12/715 (2013.01)
H04L 12/46 (2006.01)
H04L 12/741 (2013.01)

(52) U.S. Cl.
CPC ............ H04L 45/64 (2013.01); H04L 12/4633 (2013.01); H04L 45/54 (2013.01)
USPC ........... 370/392; 370/328; 370/235; 370/254; 370/315; 370/390; 370/393; 709/219; 709/224; 709/203

(58) Field of Classification Search
CPC ......... H04L 47/70; H04L 67/10; H04L 43/08; H04L 61/10; H04L 67/16; H04L 67/2852; H04L 67/42; H04L 63/20; H04L 41/0893; H04L 41/12; H04L 41/145; H04L 45/16; H04L 47/2408; H04L 61/2507; H04L 63/1408; H04B 7/14

USPC ......... 370/328, 235, 254, 315, 390, 393, 392; 709/219, 224, 203, 223
See application file for complete search history.

(56) References Cited

FOREIGN PATENT DOCUMENTS

JP 2004-166089 6/2004

OTHER PUBLICATIONS

D. Farinacci, et al., "Locator/ID Separation Protocol (LISP)", Network Working Group, draft-ietf-lisp-10, Mar. 4, 2011.
L. Mathy, et al., "LISP-DHT: Towards a DHT to map identifiers onto locators", Network Working Group, draft-mathy-lisp-dht-00, Feb. 25, 2008.
H. Soliman, et al., "Hierarchical Mobile IPv6 Mobility Management (HMIPv6)", Network Working Group, RFC 4140, Aug. 2005.

Primary Examiner — Christopher Grey
Assistant Examiner — Oussama Roudani
(74) Attorney, Agent, or Firm — Staas & Halsey LLP

(57) ABSTRACT

Tunnels are established between nodes along a packet transfer route in a communication network so that a packet is transferred from a first relay node to a second relay node via one or more intermediate relay nodes using the established tunnels. An intermediate relay node receives, from an adjacent downstream relay node, a reply message storing relay-node addresses identifying the downstream relay node and at least one intermediate relay node between the downstream relay node and the first relay node. The intermediate relay node establishes a tunnel to the downstream relay node in association with the relay-node address of the downstream relay node, updates the reply message by removing the relay-node address of the down stream relay node from the reply message, and transfers the updated reply message to an adjacent upstream relay node along the packet transfer route.

11 Claims, 20 Drawing Sheets

FIG. 4

ROUTING TABLE 66

| DESTINATION IP ADDRESS | TRANSFER DESTINATION |
|---|---|
| IP ADDRESS 1 | NEXT HOP ROUTER |
| IP ADDRESS 2 | TUNNEL 1 (TUNNEL NUMBER) |
| IP ADDRESS 3 | TUNNEL 2 (TUNNEL NUMBER) |
| ... | ... |

FIG. 5

TUNNEL MANAGEMENT TABLE 67

| TUNNEL NUMBER | ADDRESS (LOC) OF EDGE NODE AT OTHER END OF TUNNEL |
|---|---|
| TUNNEL 1 | EDGE NODE IP ADDRESS 1 |
| TUNNEL 2 | EDGE NODE IP ADDRESS 2 |
| TUNNEL 3 | EDGE NODE IP ADDRESS 3 |
| ... | ... |

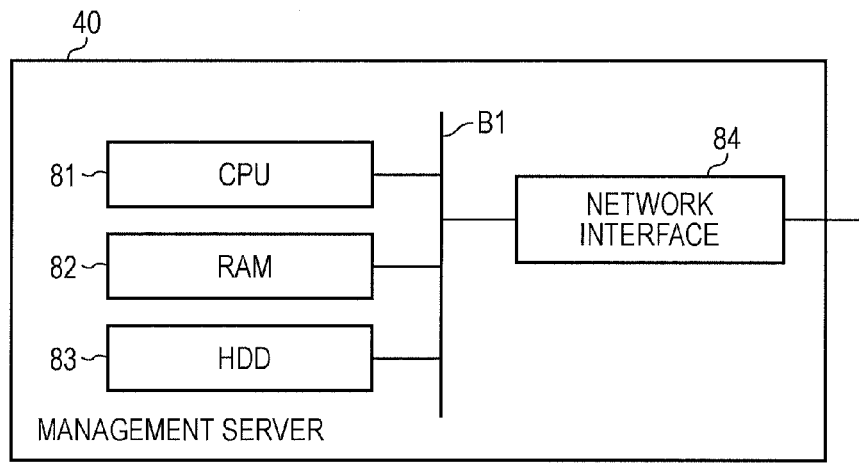
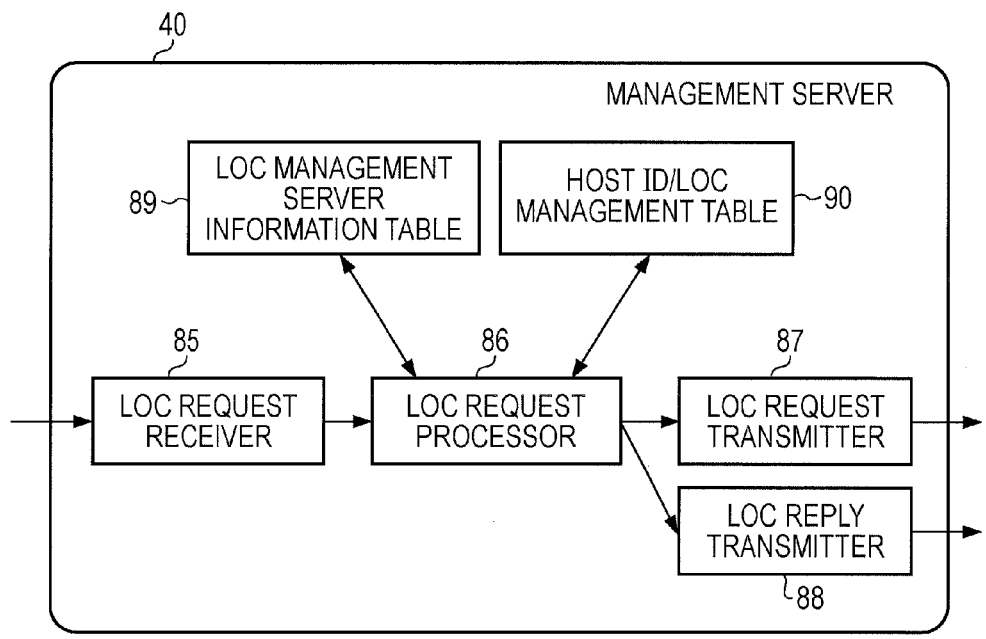

FIG. 8

LOC MANAGEMENT SERVER INFORMATION TABLE    89

| DESTINATION IP ADDRESS (HOST IP ADDRESS) | ADDRESS OF MANAGEMENT SERVER |
|---|---|
| IP ADDRESS 1 | MANAGEMENT SERVER IP ADDRESS 1 |
| IP ADDRESS 2 | MANAGEMENT SERVER IP ADDRESS 2 |
| IP ADDRESS 3 | MANAGEMENT SERVER IP ADDRESS 2 |
| ... | ... |

FIG. 9

HOST ID/LOC MANAGEMENT TABLE    90

| DESTINATION IP ADDRESS (HOST IP ADDRESS) | ADDRESS LIST (LOC LIST) OF TRAVERSED EDGE NODES | LAST EDGE |
|---|---|---|
| IP ADDRESS 1 | EDGE NODE IP ADDRESS 1 | YES |
| IP ADDRESS 2 | EDGE NODE IP ADDRESS 2 | YES |
| IP ADDRESS 3 | EDGE NODE IP ADDRESS 2 | NO |
| ... | ... | ... |

FIG. 11

LOC MANAGEMENT SERVER INFORMATION TABLE
IN MANAGEMENT SERVER 41                      89

| HOST IP ADDRESS | LOC MANAGEMENT SERVER |
|---|---|
| HOST IP2 | IP ADDRESS OF MANAGEMENT SERVER 42 |
| HOST IP3 | IP ADDRESS OF MANAGEMENT SERVER 42 |

FIG. 12

LOC MANAGEMENT SERVER INFORMATION TABLE
IN MANAGEMENT SERVER 42                      89

| HOST IP ADDRESS | LOC MANAGEMENT SERVER |
|---|---|
| HOST IP2 | IP ADDRESS OF MANAGEMENT SERVER 43 |
| HOST IP3 | IP ADDRESS OF MANAGEMENT SERVER 43 |

FIG. 13

LOC MANAGEMENT SERVER INFORMATION TABLE
IN MANAGEMENT SERVER 43                      89

| HOST IP ADDRESS | LOC MANAGEMENT SERVER |
|---|---|
| HOST IP2 | IP ADDRESS OF MANAGEMENT SERVER 44 |
| HOST IP3 | IP ADDRESS OF MANAGEMENT SERVER 44 |

FIG. 14

HOST ID/LOC MANAGEMENT TABLE
IN MANAGEMENT SERVER 42                         90

| HOST IP ADDRESS | EDGE NODE LIST | LAST EDGE |
|---|---|---|
| HOST IP2 | LOC5 | NO |
| HOST IP3 | LOC5 | NO |

FIG. 15

HOST ID/LOC MANAGEMENT TABLE
IN MANAGEMENT SERVER 43                         90

| HOST IP ADDRESS | EDGE NODE LIST | LAST EDGE |
|---|---|---|
| HOST IP2 | LOC6 | NO |
| HOST IP3 | LOC6 | NO |

FIG. 16

HOST ID/LOC MANAGEMENT TABLE
IN MANAGEMENT SERVER 44                         90

| HOST IP ADDRESS | EDGE NODE LIST | LAST EDGE |
|---|---|---|
| HOST IP2 | LOC7, LOC2 | YES |
| HOST IP3 | LOC7, LOC3 | YES |

FIG. 20

TUNNEL MANAGEMENT TABLE IN EDGE NODE 27         67

| TUNNEL # | EDGE NODE IP ADDRESS |
|---|---|
| TUNNEL 1 | LOC2 |

FIG. 21

ROUTING TABLE IN EDGE NODES 21, 25, 26, AND 27         66

| DESTINATION IP ADDRESS | TRANSFER DESTINATION |
|---|---|
| HOST IP2 | TUNNEL 1 |

FIG. 22

TUNNEL MANAGEMENT TABLE IN EDGE NODE 26         67

| TUNNEL # | EDGE NODE IP ADDRESS |
|---|---|
| TUNNEL 1 | LOC7 |

FIG. 23

TUNNEL MANAGEMENT TABLE IN EDGE NODE 25         67

| TUNNEL # | EDGE NODE IP ADDRESS |
|---|---|
| TUNNEL 1 | LOC6 |

FIG. 24

TUNNEL MANAGEMENT TABLE IN EDGE NODE 21    67

| TUNNEL # | EDGE NODE IP ADDRESS |
|---|---|
| TUNNEL 1 | LOC5 |

FIG. 25

ROUTING TABLE IN EDGE NODE 27    66

| DESTINATION IP ADDRESS | TRANSFER DESTINATION |
|---|---|
| HOST IP2 | TUNNEL 1 |
| HOST IP3 | TUNNEL 2 |

FIG. 26

TUNNEL MANAGEMENT TABLE IN EDGE NODE 27    67

| TUNNEL # | EDGE NODE IP ADDRESS |
|---|---|
| TUNNEL 1 | LOC2 |
| TUNNEL 2 | LOC3 |

FIG. 27

ROUTING TABLE IN EDGE NODES 21, 25, AND 26    66

| DESTINATION IP ADDRESS | TRANSFER DESTINATION |
|---|---|
| HOST IP2 | TUNNEL 1 |
| HOST IP3 | TUNNEL 1 |

FIG. 29

LOC MANAGEMENT SERVER INFORMATION TABLE
IN MANAGEMENT SERVER 42                                89

| HOST IP ADDRESS | LOC MANAGEMENT SERVER |
|---|---|
| HOST IP2 | IP ADDRESS OF LOC MANAGEMENT SERVER 44 |
| HOST IP3 | IP ADDRESS OF LOC MANAGEMENT SERVER 44 |

FIG. 30

HOST ID/LOC MANAGEMENT TABLE
IN MANAGEMENT SERVER 42                    90

| HOST IP ADDRESS | EDGE NODE LIST | LAST EDGE |
|---|---|---|
| HOST IP2 | LOC5, LOC6 | NO |
| HOST IP3 | LOC5, LOC6 | NO |

APPARATUS AND METHOD FOR ESTABLISHING TUNNELS BETWEEN NODES IN A COMMUNICATION NETWORK

CROSS-REFERENCE TO RELATED APPLICATIONS

This application is based upon and claims the benefit of priority of the prior Japanese Patent Application No. 2011-190822, filed on Sep. 1, 2011, and the Japanese Patent Application No. 2012-183081, filed on Aug. 22, 2012, the entire contents of which are incorporated herein by reference.

FIELD

The embodiments discussed herein are related to an apparatus and method for establishing tunnels between nodes in a communication network.

BACKGROUND

ID-Locator separation technology is being investigated as a technology for reducing the number of paths processed by a router on the Internet backbone. A representative example of such technology is the Locator/Identifier Separation Protocol (LISP) currently being developed for standardization by the Internet Engineering Task Force (IETF). FIG. 34 is a schematic diagram illustrating an example of LISP.

LISP is provided with a core network 1 and one or more access networks (for example, access networks 2 and 3 in FIG. 34) that are connected to the core network 1. The core network 1 is provided with router, called edge nodes, that accommodates access lines from access networks. In the example in FIG. 34, an edge node 5 (LOC1) that accommodates access lines from a host 4 (ID#1) in the access network 2 and an edge node 7 (LOC2) that accommodates access lines from a host 6 (ID#2) in the access network 3 are illustrated. "ID" represents an address (IP address) used in an access network, and "LOC" (Locator: Location address) represents the address (IP address) of an edge node in a core network.

In LISP, access network addresses and core network addresses are managed separately. For this reason, in LISP, one or more management servers are provided to manage the relationships between addresses used for access networks and addresses used for core networks. In FIG. 34, a management server 8 corresponding to the edge node 5 and a management server 9 corresponding to the edge node 7 are provided. The edge node 5 registers information on the relationship between the ID of the host 4 (ID#1) and the LOC of the edge node 5 (LOC1) in the management server 8 (<1> in FIG. 34), and the edge node 7 registers the relationship between the ID of the host 5 (ID#2) and the LOC of the edge node 6 (LOC2) in the management server 9.

LISP operation will now be described with reference to FIG. 34. As an example, operation will be illustrated for the case where the host 4 transmits data to the host 6. The host 4 transmits, to the edge node 5, a packet provided with a header containing the address of the host 6 (host ID: ID#2). Upon receiving the packet from the host 4, the edge node 5 attempts to establish a tunnel to the edge node (edge node 7) accommodating a host that becomes a destination of the packet.

At this point, when the edge node 5 has not learned the address (LOC2) of the edge node 7 accommodating the destination host 6 yet, the edge node 5 transmits, to the corresponding management server 8, a message (LOC request) querying the corresponding management server 8 for the destination core network address (LOC) (as denoted by <3> in FIG. 34). Upon receiving a LOC request, the management server 8 forwards the LOC request to the management server 9 that manages the LOC corresponding to the destination address (ID#2) stored in the LOC request (as denoted by <4> in FIG. 34). The LOC request reaches the management server 9 with being transferred directly, or via a relay device (such as a router), on a control plane (C-Plane), as illustrated in FIG. 34. Upon receiving the LOC request, the management server 9 transmits a message (LOC reply) containing the address (LOC2) of the edge node corresponding to the destination host ID (ID#2), where the address is managed by the management server 9, to the edge node 5 from which the LOC request has originated (as denoted by <5> in FIG. 34). Upon receiving the LOC reply, the edge node 5 establishes an IP tunnel to the edge node 7. Subsequently, the edge node 5 generates an encapsulated packet (LISP packet) by attaching a header containing the destination edge node address (the address (LOC2) of the edge node 7) to the packet from the host 4 (user IP packet). The LISP packet is transmitted through the IP tunnel and reaches the edge node 7. The edge node 7 removes the header from the LISP packet (decapsulation), and transfers the obtained user IP packet to the host 6.

For more information, see Japanese Laid-open Patent Publication No. 2004-166089, "Locator/ID Separation Protocol (LISP) draft-ietf-lisp-10", D. Farinacci, V. Fuller, D. Meyer, D. Lewis, Cisco Systems, Mar. 4, 2011, "LISP-DHT: Towards a DHT to map identifiers onto locators", draft-mathy-lisp-dht-00, L. Mathy, Lancaster U, L. Iannone, O. Bonaventure, UCLouvain, Feb. 25, 2008, and "Hierarchical Mobile IPv6 Mobility Management (HMIPv6)", H. Soliman, Flarion, C. Castelluccia, INRIA, K. El Malki, Ericsson, L. Bellier, INRIA, August 2005.

SUMMARY

According to an aspect of the invention, there is provided a system for establishing tunnels between nodes along a packet transfer route in a communication network. The system is provided with a plurality of relay nodes and a plurality of management servers. The plurality of relay nodes includes first and second relay nodes and one or more intermediate relay nodes via which a packet is to be transferred along the packet transfer route. The first relay node receives the first packet including a destination address. The second relay node is communicably coupled to a terminal identified by the destination address included in the first packet. The plurality of management servers includes a first management server managing the first relay node and a second management server managing the second relay node. The first relay node is configured to transmit a request message including the destination address to the first management server so as to resolve relay-node addresses used for transferring the packet. The plurality of management servers transfer, from the first management server to the second management server, the request message based on transfer control information that is held in each of the plurality of management servers in association with the destination address, while storing, in the request message, a first list of relay-node addresses identifying relay nodes, included in the plurality of relay nodes, via which the first packet is to be transferred. The second management apparatus, upon receiving the request message, creates a reply message including a second list of relay-node addresses that respectively identify the first relay node, the one or more intermediate relay nodes via which the first packet is to be transferred, and the second relay node. The second list is generated by adding, to the first list, at least one relay-node address held in the second management server, where the at least one relay-node address includes a relay-node address identifying the second relay node. Two or more relay nodes other than the second relay node, whose relay-node addresses are stored in the second list of relay-node addresses, are each configured to: receive the reply message, establish, for the destination address, a tunnel used for transferring the packet between a pair of relay nodes included in the two or more relay nodes, in association with one of the second list of relay-node addresses included in the received reply message, update the second list by removing, from the second list, at least one relay-node address including a relay-node address associated with the established tunnel, and transfer, when at least one relay-node address remains in the updated second list, the reply message including the updated second list to a relay node identified by one of the at least one relay-node address remaining in the updated second list. When the packet is outputted from one of the two or more relay nodes via the established tunnel, the packet is encapsulated with a header that stories, as a destination address, a relay-node address associated with the established tunnel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a routing table, according to an embodiment;

FIG. 5 is a diagram illustrating an example of a tunnel management table, according to an embodiment;

FIG. 6 is a diagram illustrating an example of a hardware configuration of a management server, according to an embodiment;

FIG. 7 is a diagram illustrating an example of a functional configuration of a management server, according to an embodiment;

FIG. 8 is a diagram illustrating an example of a LOC management server information table, according to an embodiment;

FIG. 9 is a diagram illustrating an example of a host ID/LOC management table, according to an embodiment;

FIG. 11 is a diagram illustrating an example of values registered in a LOC management server information table in a management server, according to an embodiment;

FIG. 12 is a diagram illustrating an example of values registered in a LOC management server information table in a management server, according to an embodiment;

FIG. 13 is a diagram illustrating an example of values registered in a LOC management server information table in a management server, according to an embodiment;

FIG. 14 is a diagram illustrating an example of values registered in a host ID/LOC management table in a management server, according to an embodiment;

FIG. 15 is a diagram illustrating an example of values registered in a host ID/LOC management table in a management server, according to an embodiment;

FIG. 16 is a diagram illustrating an example of values registered in a host ID/LOC management table in a management server, according to an embodiment;

FIG. 20 is a diagram illustrating an example of an entry registered in a tunnel management table, according to an embodiment;

FIG. 21 is a diagram illustrating an example of an entry registered in a routing table, according to an embodiment;

FIG. 22 is a diagram illustrating an example of an entry registered in a tunnel management table, according to an embodiment;

FIG. 23 is a diagram illustrating an example of an entry registered in a tunnel management table, according to an embodiment;

FIG. 24 is a diagram illustrating an example of an entry registered in a tunnel management table, according to an embodiment;

FIG. 25 is a diagram illustrating an example of entries registered in a routing table, according to an embodiment;

FIG. 26 is a diagram illustrating an example of entries registered in a tunnel management table, according to an embodiment;

FIG. 27 is a diagram illustrating an example of entries registered in a routing table, according to an embodiment;

FIG. 29 is a diagram illustrating an example of entries registered in a LOC management server information table, according to an embodiment;

FIG. 30 is a diagram illustrating an example of entries registered in a host ID/LOC management table, according to an embodiment;

DESCRIPTION OF EMBODIMENTS

LISP has a first feature that a tunnel is established dynamically and a second feature that a packet transmitted from a host is forwarded through the tunnel without being modified. Operations utilizing these features for host movement is being investigated by the IETF LISP WG (Working Group).

Figure 34:
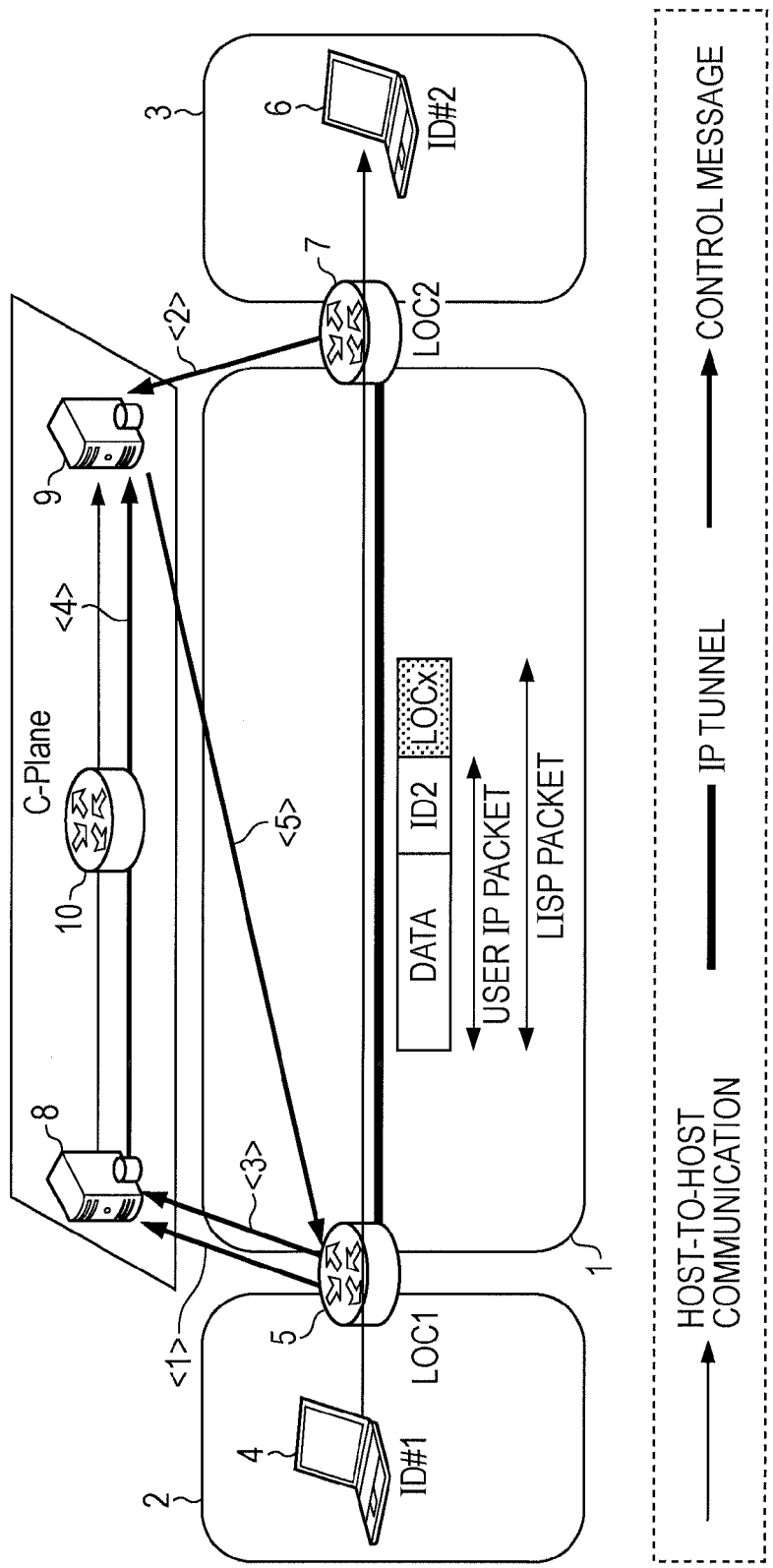
FIG. 34 is a schematic diagram illustrating an example of a Locator/Identifier Separation Protocol (LISP).

When a change has occurred in an edge node on the egress side of a core network (such as the edge node 7 illustrated in FIG. 34) in association with host movement, a tunnel is reconstructed (LOC change) between the new egress edge node and another edge node (such as an ingress edge node). In this case, it is preferable to minimize any delays or additional processing load that is caused within the core network by such LOC changes. Further, in order to reduce delays and additional processing load due to the LOC changes, there is demand for technology able to collectively establish series-connected tunnels coupling plural edge nodes together.

Hereinafter, embodiments of the disclosed technology will be described with reference to the drawings. The configurations of the embodiments herein are exemplary, and the disclosed technology is not limited thereto.

(First Embodiment)

<Network Configuration>

Figure 1:
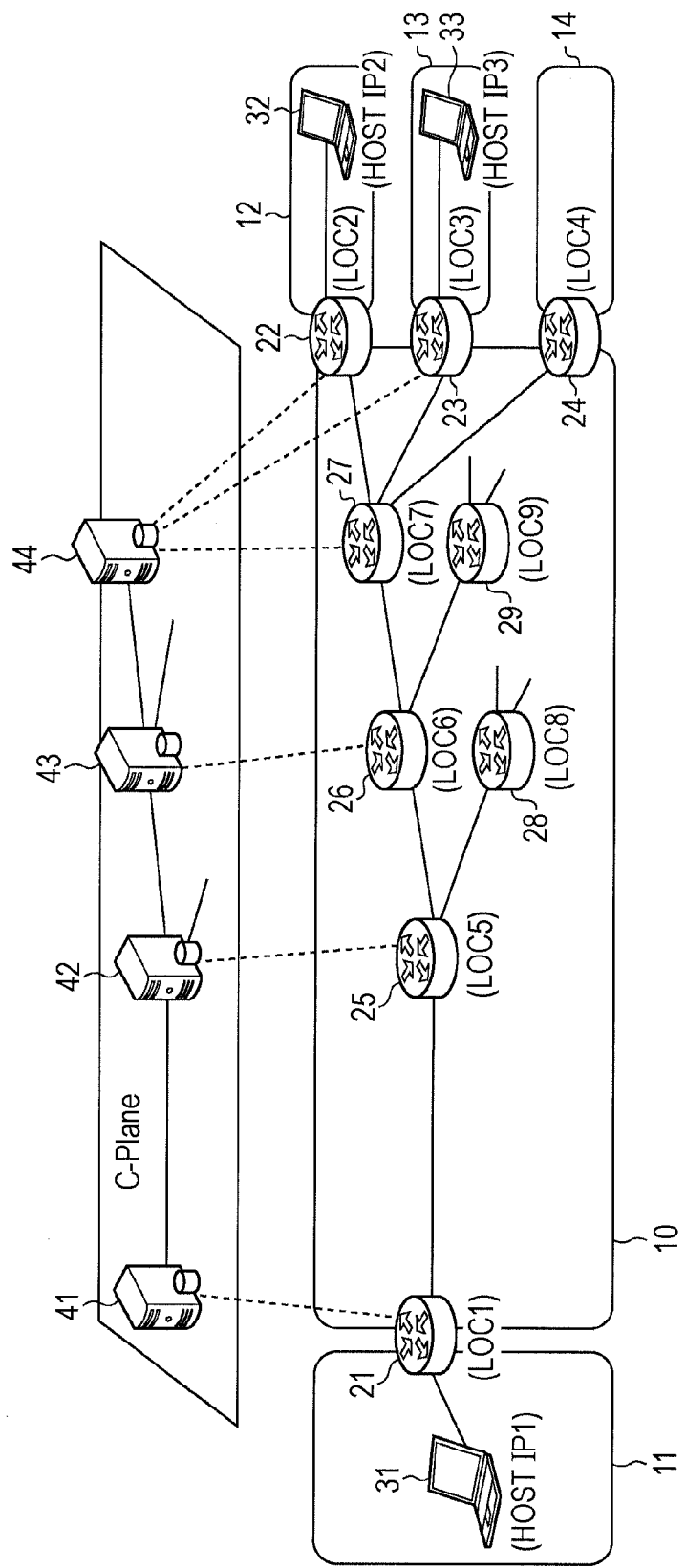
FIG. 1 is a diagram illustrating a configuration example of a network system, according to a first embodiment.

FIG. 1 is a diagram illustrating a configuration example of a network system, according to a first embodiment. FIG. 1 illustrates a LISP network in which IP packets are transmitted by means of tunneling (encapsulation). With LISP, tunnels are dynamically established in order to forward packets in a core network 10.

The network system illustrated in FIG. 1 may be configured to include a core network 10 and a plurality of access networks 11, 12, 13, and 14 accommodated by the core network 10. The core network 10 is provided with a plurality of routers that function as a plurality of edge nodes. In the example of FIG. 1, edge nodes 21 to 29 are depicted. An edge node is an example of a relay device. The edge nodes 21 to 29 have respective edge node addresses (IP addresses) LOC1 to LOC9 which are used on the core network 10. The edge nodes 21 to 27 serve as a plurality of relay nodes.

The edge node 21 accommodates access lines from a host 31 that belongs to an access network 11. The edge node 21 is an example of a device serving as a first relay node. The edge node 22 accommodates access lines from a host 32 that belongs to an access network 12. The edge node 22 serves as a second relay node. The edge node 23 accommodates access lines from a host 33 that belongs to an access network 13. The edge node 23 serves as a third relay node. The edge node 27 serves as a fourth relay node. The edge nodes 25 to 27 are examples of one or more intermediate relay nodes.

The hosts 31 to 33 have respective IP addresses ID#1 (Host IP1), ID#2 (Host IP2), and ID#3 (Host IP3) which are used on access networks. The hosts 31 to 33 may include a stationary or mobile client device such as a personal computer (PC), personal digital assistant (PDA), smartphone, or cell phone. Access lines may be wired or wireless. The respective hosts 31 to 33 are examples of clients.

The edge node 25 of the core network 10 is connected to the edge node 21 via a physical line, and connected to the edge nodes 26 and 28 via respective physical lines. The edge node 26 is connected to the edge nodes 27 and 29 via respective physical lines. The edge node 27 is connected to the edge nodes 22, 23, and 24 via respective physical lines. Further, the edge nodes 28 and 29 are connected to each other in the core network 10, which are not depicted in FIG. 1. As seen from the example illustrated in FIG. 1, the edge node 21 is an ingress edge node, and the plural edge nodes 25 to 29 form a tree topology with the edge node 25 at the root.

One or more management servers may be disposed on the control plane (C-Plane) of the core network 10, in which information on relationships between LOCs (identification information identifying edge node positions) and IDs (identifiers identifying hosts) are registered. In the example illustrated in FIG. 1, management servers 41 to 44 are disposed. The management server 41 manages the edge node 21 and stores information on relationships between the LOC of the edge node 21 and the IDs of one or more hosts (such as the host 31) accommodated by the edge node 21.

The management server 44 may store information on relationships between the LOC of the edge node 22 and the IDs of hosts (such as the host 32) accommodated by the edge node 22, relationships between the LOC of the edge node 23 and the IDs of hosts (such as the host 33) accommodated by the edge node 23, and relationships between the LOC of the edge node 27 and the IDs of hosts accommodated by the edge node 27. The management servers 42 and 43 may respectively store information on relationships between the LOCs of the edge nodes 25 and 26 and the IDs of the hosts respectively accommodated by the edge nodes 25 and 26. The management servers 41 to 44 serve as a plurality of management devices, the management server 41 serves as a first management server, and the management server 44 serves as a second management server.

The management servers 41 to 44 are connected with each other via a network in which C-Plane control packets are transferred. Further, each of the management servers 41 to 44 is connected via a communication line to an edge node under control of the each management server, and is able to transmit and receive control packets to and from the edge node.

<Configuration of an Edge Node>

Figure 2:
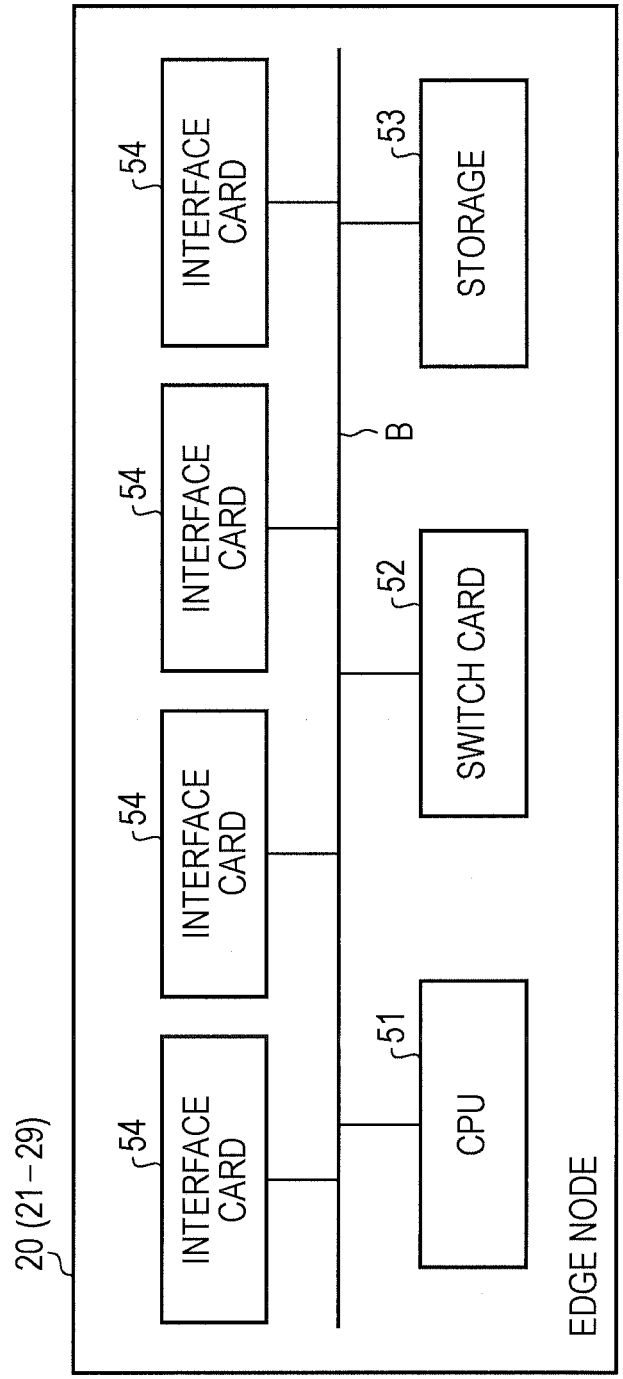
FIG. 2 is a diagram illustrating an example of a hardware configuration of an edge node, according to an embodiment.

FIG. 2 is a diagram illustrating an example of a hardware configuration of an edge node, according to an embodiment. FIG. 2 illustrates, as an example, a hardware configuration of an edge node 20 serving as any one of edge nodes 21 to 29 of FIG. 1. In the following description, the expression "edge node 20" may be used when describing the edge nodes 21 to 29 without individually distinguishing among them. As depicted in FIG. 2, an edge node 20 may be configured to include a central processing unit (CPU) 51, a switch card 52, storage 53, and one or more interface cards 54 (four interface cards are depicted as the one or more interface cards 54 in FIG. 2). The above mentioned components in FIG. 2 are connected to each other via a bus B. The interface card 54 may be, for example, a transceiver. The CPU 51 may be, for example, a control device.

Each interface card 54 transmits and receives packets for the edge node 20. The switch card 52 transfers packets, or in other words, receives packets received by respective interface cards 54 via the bus B, and transfers the received packets via the bus B to the interface cards corresponding to the respective destinations of the packets. The CPU 51 controls overall operation of the edge node 20. The storage 53 stores programs that are executed by the CPU 51 in order to control operation of the edge node 20, as well as data that is used when such programs are executed.

The storage 53 may include memory (a recording medium) used as a work area for the CPU 51, such as random access memory (RAM), and a non-volatile recording medium that records programs executed by the CPU 51 and data regarding various settings that define operation of the edge node 20. The examples of the non-volatile recording medium may include read-only memory (ROM), EEPROM, flash memory, and a hard disk drive (HDD).

The switch card 52 may be provided with electrical and/or electronic circuits that function as a receiver and a transmitter used for internal communication with respective interface cards 54. In addition, the switch card 52 may include a storage device (used as a buffer) that temporarily retains packets received from the interface cards 54. The switch card 52 also may include a storage device that holds a table storing information used for transfer. As the storage devices, one or more devices may be selected, from among various non-volatile or volatile recording media such as RAM, ROM, EEPROM, flash memory, and hard disks, according to the intended usage, and the selected one or more devices may be incorporated into the switch card 52.

The switch card 52 transfers packets on the basis of information held in tables. Packet transfer involves determining an output path for a received packet, as well as encapsulating and decapsulating packets. Packet transfer may be realized by hardware processing that is performed using one or more semiconductor integrated circuits (including application-specific integrated circuits (ASICs)) included in the electrical and/or electronic circuits incorporated into the switch card 52 (i.e., processing by a forwarding circuit), by software processing that is performed using an on-board processor in the switch card 52 (such as a CPU, digital signal processor (DSP) or field-programmable gate array (FPGA)) executing a program (i.e., processing by a processor), or by a combination of the above hardware and software processing.

The CPU 51 manages overall operation of the edge node 20 by executing a program stored in the storage 53. For example, the CPU 51 may rewrite the contents of a table provided in the switch card 52 on the basis of information received from a management server. The CPU 51 is an example of a processor (or a microprocessor). Examples of a processor may include a DSP and an FPGA.

Figure 3:
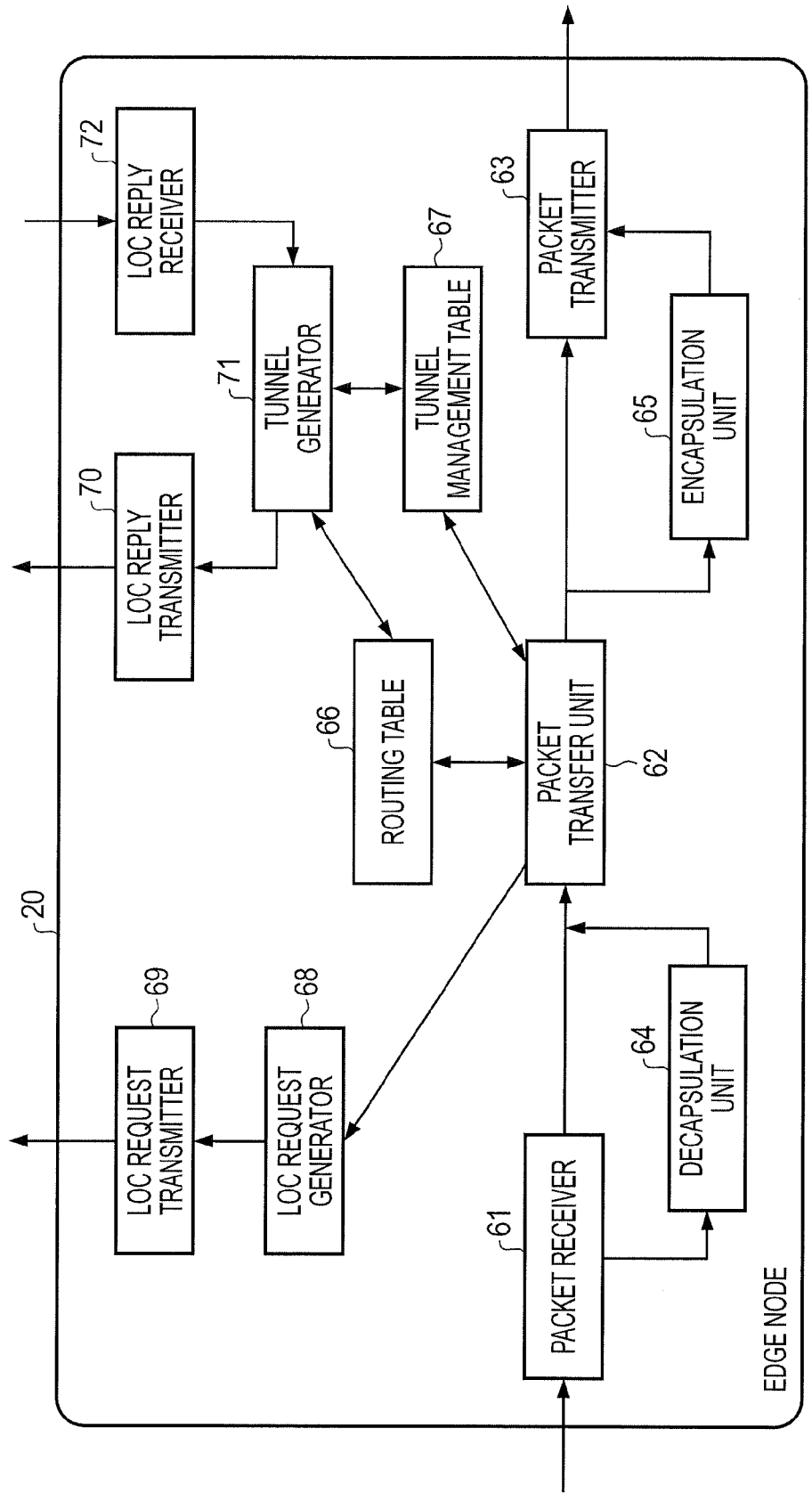
FIG. 3 is a diagram illustrating an example of a functional configuration of an edge node, according to an embodiment.

FIG. 3 is a diagram illustrating an example of a functional configuration of an edge node, according to an embodiment. The functional configuration of FIG. 3 may be realized, for example, by an edge node 20 having the hardware configuration illustrated in FIG. 2. In FIG. 3, an edge node 20 may be configured to include a packet receiver 61, a packet transfer unit 62, a packet transmitter 63, a decapsulation unit 64, and an encapsulation unit 65.

The edge node 20 may also include a routing table 66, a tunnel management table 67, a LOC request generator 68, and a LOC request transmitter 69. Further, the edge node 20 may include a LOC reply transmitter 70, a tunnel generator 71, and a LOC reply receiver 72.

The packet receiver 61 receives packets (i.e., data packets) over a network, and the packet transmitter 63 transmits packets (i.e., data packets) over a network. The functions of the packet receiver 61 and the packet transmitter 63 may be realized using the interface cards 54.

When a packet received by the packet receiver 61 is being encapsulated (i.e., a LISP packet), the decapsulation unit 64 removes the header (i.e., the LISP header) attached to the encapsulated packet.

The encapsulation unit 65 receives a packet to be encapsulated (i.e., a packet to be transmitted via a tunnel) from the packet transfer unit 62. The encapsulation unit 65 attaches, at the beginning of the packet (encapsulates the packet), a header (a LISP header) in which the address (LOC) of an edge node positioned at the receiving end of a tunnel is set as the destination address.

The packet transfer unit 62 receives a packet from the packet receiver 61 or the decapsulation unit 64. The packet transfer unit 62 references the routing table 66 and determines a path (i.e., an output port) corresponding to the destination IP address of the packet. When the path determined by referencing the routing table 66 is a tunnel, the packet transfer unit 62 references the tunnel management table 67 and acquires the address of the edge node at the other end of the tunnel. When it is determined that there exist no entries indicating an output path corresponding to the destination IP address of the packet, as a result of searching the routing table 66 (i.e., no corresponding entries are found), the packet transfer unit 62 queries the LOC request generator 68 about whether or not to perform tunnel transfer.

The routing table 66 is configured as a table including one or more entries each storing information on a transfer destination in association with a destination address of a packet.

FIG. 4 is a diagram illustrating an example of a routing table, according to an embodiment. As illustrated in FIG. 4, the routing table 66 includes entries each storing information on a transfer destination in association with destination addresses (i.e., destination IP addresses) of a packet. Information indicating the next hop router or a tunnel number is registered as information on a transfer destination.

The tunnel management table 67 stores information that are required for establishing tunnels that couple edge nodes. Namely, under the assumption that an edge node is positioned at an end node of a tunnel established between edge nodes, the address (LOC) of the other edge node positioned at the other end of the tunnel is registered in the tunnel management table 67 in association with a tunnel number assigned to the tunnel.

FIG. 5 is a diagram illustrating an example of a tunnel management table, according to an embodiment. As illustrated in FIG. 5, for example, the tunnel management table 67 includes one or more entries each storing the address (LOC) of the edge node positioned at the other end of the tunnel in association with tunnel identification information (for example, a tunnel number).

The above mentioned decapsulation unit 64, packet transfer unit 62, encapsulation unit 65, routing table 66, and tunnel management table 67 may be realized using the switch card 52.

Upon receiving a query from the packet transfer unit 62, the LOC request generator 68 performs processing for requesting LOC in order to resolve the address of an edge node corresponding to the destination address of a packet. In other words, the LOC request generator 68 generates a LOC request message (hereinafter also simply expresses as "a LOC request") that requests the address of an edge node corresponding to a destination address, where the destination address and the address of an edge node that has originated the LOC request are stored in the generated LOC request message. The LOC request generator 68 may be realized using the CPU 51 that receives a query signal from the switch card 52 via the bus B.

The LOC request transmitter 69 of an edge node 20 transmits a LOC request to the management server 40 managing the edge node 20. For example, when an edge node 21 (see FIG. 1) is used as the edge node 20, the LOC request is transmitted to the management server 41. The LOC request transmitter 69 may be realized using an interface card 54 that receives via the bus B a LOC request generated by the CPU 51. The LOC reply receiver 72 of an edge node receives a LOC reply message (hereinafter also simply expressed as "a LOC reply") transmitted from the management server managing the edge node (such as the management server 41 managing the edge node 21), or from another edge node in a "lower layer". Here, in the tree topology formed by the plurality of edge nodes illustrated in FIG. 1, edge nodes closer to the root with respect to an given edge node are defined to be in an "upper layer", and edge nodes closer to the leaves are defined to be in a "lower layer". The LOC reply receiver 72 may be realized using an interface card 54.

The tunnel generator 71 establishes a tunnel to a lower layer edge node using a LOC (i.e., edge node address) included in a LOC list contained in a received LOC reply. A tunnel is established by registering a tunnel number and the address of a lower layer edge node in the tunnel management table 67.

Further, the tunnel generator 71 creates a LOC replay to be transferred to an upper layer edge node by removing the lower layer edge node address from the LOC list in the received LOC reply. The tunnel generator 71 may determine an upper layer including an edge node to which the generated LOC replay is to be transferred, on the basis of the destination address, the source address, the protocol ID, and the port number, and then the addresses of edge nodes in bypassed layers are also removed from the LOC list in addition to the lower-layer edge node address. The tunnel generator 71 may be realized using the CPU 51 that receives via the bus B a LOC reply received by an interface card 54.

The LOC reply transmitter 70 transmits the generated LOC reply to another edge node (i.e., an upper layer edge node). The LOC reply transmitter 70 may be realized using an interface card 54 that receives via the bus B the LOC reply generated by the CPU 51.

<Configuration of a Management Server>

FIG. 6 is a diagram illustrating an example of a hardware configuration of a management server, according to an embodiment. In the following description, the expression "management server 40" will be used when describing the management servers 41 to 44 without individually distinguishing among them. A general-purpose computer such as a personal computer (PC) or a specialized computer such as a server machine may be implemented as a management server 40. As depicted in FIG. 6, a management server 40 may be configured to include a CPU 81, RAM 82, an HDD 83, and a network interface (i.e., an interface (IF) circuit or IF device) 84, which are connected to each other via a bus B1.

The RAM 82 is an example of a main memory for the management server 40 (the CPU 81). The RAM 82 is a work area for the CPU 81 to temporarily store data used when executing various programs, such as an operating system (OS) and application programs.

The HDD 83 is an example of auxiliary storage for the management server 40 (the CPU 81). The HDD 83 stores various programs such as an OS and application programs executed by the CPU 81, as well as data used in the execution of such programs. Data may be stored in a table or database held by the HDD 83.

The CPU 81 is an example of a processor (or microprocessor) that loads various programs stored in the HDD 83 into the RAM 82 and executes them. This allows the CPU 81 to manage overall operation of the management server 40. For example, the CPU 81 may perform processing on control packets (such as LOC requests) received from the edge node 20 via the network interface 84.

The network interface 84 accommodates communication lines that are coupled to at least one edge node and at least one other management server, and performs processing on connection to an external network (processing for transmission and reception of packets).

FIG. 7 is a diagram illustrating an example of a functional configuration of a management server, according to an embodiment. FIG. 7 illustrates an example that is realized using the hardware configuration of the management server 40 illustrated in FIG. 6. As illustrated in FIG. 7, the management server 40 functions as a device provided with a LOC request receiver 85, a LOC request processor 86, a LOC request transmitter 87, a LOC reply transmitter 88, a LOC management server information table 89, and a host ID/LOC management table 90. The LOC request receiver 85 receives a LOC request transmitted by an edge node 20 or an upper layer management server. The LOC request receiver 85 may be realized using the network interface 84. In the layer relationships of management servers 40, the management server managing the LOC of the ingress edge node is defined to be in the uppermost layer, and management servers positioned closer to the leaves are defined to be in a lower layer. In other words, layer relationships based on edge node layer relationships are set for management servers.

The LOC request transmitter 87 transmits a LOC request to lower layer management servers. The LOC request transmitter 87 may be realized using the network interface 84.

The LOC reply transmitter 88 transmits a LOC reply to an upper layer edge node 20. The LOC reply transmitter 88 may be realized using the network interface 84.

The LOC request processor 86 identify an edge node or an edge node list corresponding to a destination address contained in a LOC request received by the LOC request receiver 85, by referring to the host ID/LOC management table 90.

When the identified edge node or edge node list does not include an edge node at the lowermost layer, the LOC request processor 86 adds the identified edge node or edge node list to the received LOC request, and sends the LOC request to the LOC request transmitter 87. In contrast, when the identified edge node or edge node list includes an edge node at the lowermost layer, the LOC request processor 86 generates a LOC reply including a merged LOC list that contains the LOC list included in the received LOC request as well as the identified edge node or edge node list. Further, the address of an edge node that has originated the LOC request is stored in the generated LOC reply. The LOC request processor 86 sends the generated LOC reply to the LOC reply transmitter 88 so that the generated LOC reply is transferred to the edge node 20.

When generating the above LOC request or LOC reply, the LOC request processor 86 may determine edge nodes via which the LOC request or LOC reply is to be transferred on the basis of the edge node destination address, the source address, the protocol ID, and the port number, and stores a list of the determined edge nodes in the LOC list. The LOC request processor 86 may be realized using the CPU 81 that receives via the bus B1 a LOC request received by the network interface 84. The CPU 81 sends LOC requests and LOC replies generated by the LOC request processor 86 to the network interface 84 via the bus B1.

In the LOC management server information table 89, identification information (i.e., IP addresses) identifying lower layer management servers 40 to which LOC requests are to be transferred and which are associated with destination host IP addresses is registered.

FIG. 8 is a diagram illustrating an example of a LOC management server information table, according to an embodiment. As illustrated in FIG. 8, the LOC management server information table 89 includes one or more entries each storing the IP address of a management server 40 in association with a destination host IP address.

The host ID/LOC management table 90 stores a list of addresses of edge nodes 20 traversed by a packet transferred to a destination IP address, and information indicating whether or not the list contains an edge node in the lowermost layer (i.e., leaf), which is also called a last edge.

FIG. 9 is a diagram illustrating an example of a host ID/LOC management table, according to an embodiment. As illustrated in FIG. 9, the host ID/LOC management table 90 includes one or more entries each storing, in association with a destination host IP address (host ID), an address list containing the addresses of one or more edge nodes 20 traversed by a packet transferred over the core network 10 to the destination IP address (also called an "edge node list" or "LOC list"), and last-edge information (such as flag information indicating "Yes" or "No") indicating whether or not the edge node list contains the address of an edge node (called the last edge) at the lowermost layer (i.e., leaf) in the edge node tree.

The LOC management table 89 and the host ID/LOC management table 90 may be stored in the HDD 83. However, it is also possible for a single table to manage both the information registered in the LOC management server information table 89 and the information registered in the host ID/LOC management table 90.

<Operational Example 1>

Next, an operational example 1 for the network system illustrated in FIG. 1 will be described.

Figure 10:
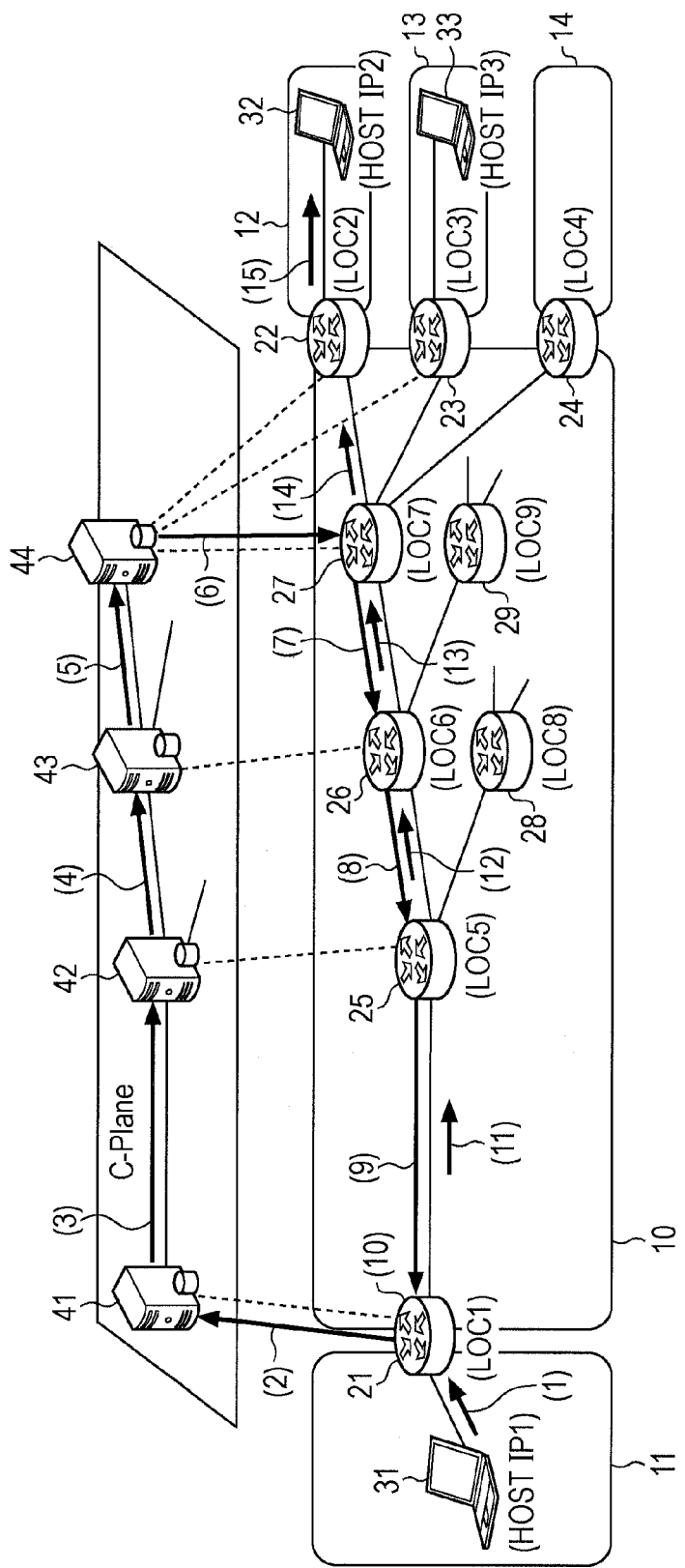
FIG. 10 is a diagram illustrating an example of an operation of a system, according to an embodiment.

FIG. 10 is a diagram illustrating an example of an operation of a system, according to an embodiment. FIG. 10 illustrates an example of operations for the network system illustrated in FIG. 1. Hereinafter, operations in which the host 31 (ID#1) illustrated in FIG. 10 transfers a packet to the host 32 (ID#2) will be explained.

The host 31 is connected to an edge node 21, and the host 32 is connected to an edge node 22. An IP address "Host IP1" (ID#1) is assigned to the host 31, and "Host IP2" (ID#2) is assigned to the host 32. The edge node 22 is positioned at a leaf in a layered edge node tree. In the example of FIG. 10, the edge node tree is formed with an edge node 25 as the root (uppermost layer), an intermediate layer (upper) that includes an edge node 26, an intermediate layer (lower) that includes an edge node 27, and a lowermost layer that includes edge nodes 22, 23, and 24.

The edge nodes 21 to 27 are respectively assigned the IP addresses (i.e., edge node addresses) "LOC1", "LOC2", "LOC3", "LOC4", "LOC5", "LOC6", and "LOC7".

The edge nodes 21 to 27 are managed by management servers 41 to 44. The edge nodes 21 to 27 and the management servers 41 to 44 are related as follows. That is, the edge node 21 is managed by the management server 41; the edge node 25 is managed by the management server 42; the edge node 26 is managed by the management server 43; and the edge nodes 27, 22, 23, and 24 are managed by the management server 44. As with the management server 44, the management servers 40 are able to not only manage a single edge node, but also manage a plurality of edge nodes positioned in the same layer of the edge node tree, and further manage a plurality of edge nodes belonging to multiple (i.e., different) layers.

FIG. 11 is a diagram illustrating an example of values registered in a LOC management server information table in a management server, according to an embodiment, where the LOC management server information table 89 of the management server 41 includes an entry storing the IP address of the management server 42 in association with the IP address "Host IP2" of the host 32, and an entry storing the IP address of the management server 42 in association with the IP address "Host IP3" of the host 33.

FIG. 12 is a diagram illustrating an example of values registered in a LOC management server information table in a management server, according to an embodiment, where the LOC management server information table 89 of the management server 42 includes an entry storing the IP address of the management server 43 in association with the IP address "Host IP2" of the host 32, and an entry storing the IP address of the management server 43 in association with the IP address "Host IP3" of the host 33.

FIG. 13 is a diagram illustrating an example of values registered in a LOC management server information table in a management server, according to an embodiment, where the LOC management server information table 89 of the management server 43 includes an entry storing the IP address of the management server 44 in association with the IP address "Host IP2" of the host 32, and an entry storing the IP address of the management server 44 in association with the IP address "Host IP3" of the host 33.

FIG. 14 is a diagram illustrating an example of values registered in a host ID/LOC management table in a management server, according to an embodiment, where the host ID/LOC management table 90 of he management server 42 includes entries for the IP address "Host IP2" of the host 32 and the IP address "Host IP3" of the host 33, respectively. The entries each store the corresponding edge node list "LOC5" and information indicating that the last edge is not included in the edge node list ("No").

FIG. 15 is a diagram illustrating an example of values registered in a host ID/LOC management table in a management server, according to an embodiment, where the host ID/LOC management table 90 of the management server 43 includes entries for the IP address "Host IP2" of the host 32 and the IP address "Host IP3" of the host 33, respectively. The entries each store the corresponding edge node list "LOC6" and information indicating that the last edge is not included in the edge node list ("No").

FIG. 16 s a diagram illustrating an example of values registered in a host ID/LOC management table in a management server, according to an embodiment, where the host ID/LOC management table 90 in the management server 44 includes an entry for the IP address "Host IP2" of the host 32, which stores the corresponding edge node list "LOC7, LOC2" and information indicating that the last edge is included ("Yes"). The host ID/LOC management table 90 in the management server 44 also includes an entry for the IP address "Host IP3" of the host 33, which stores the corresponding edge node list "LOC7, LOC3" and information indicating that the last edge is included ("Yes").

Figure 17:
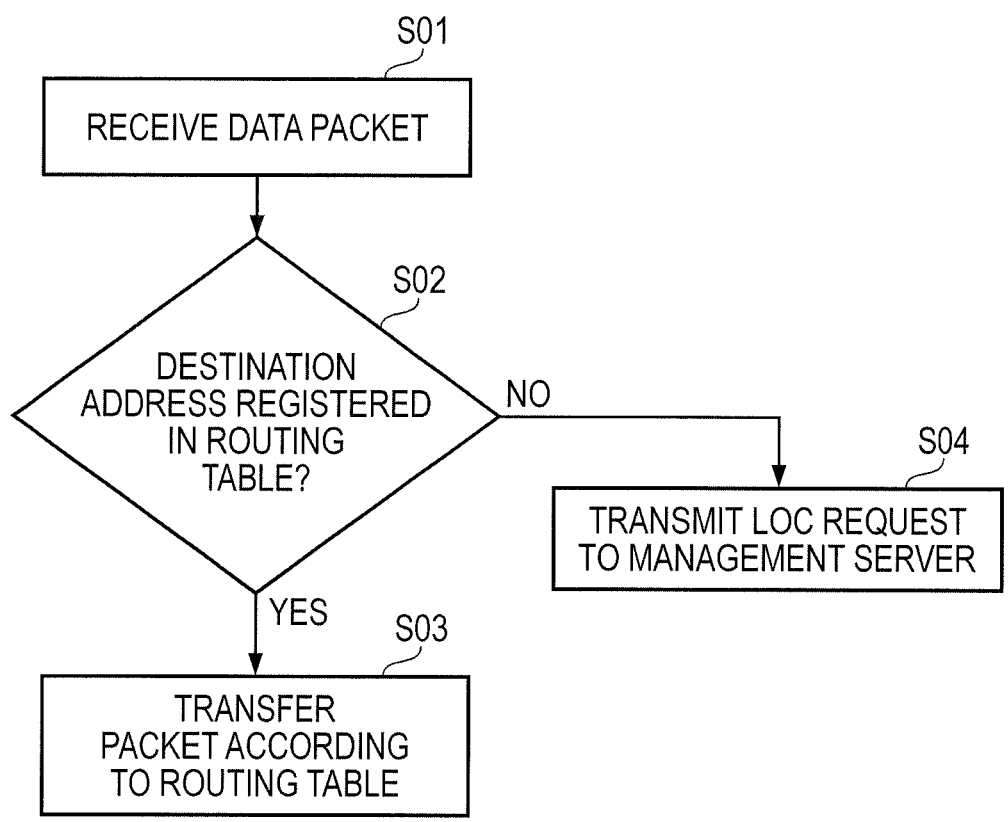
FIG. 17 is a diagram illustrating an example of an operational flowchart for a process performed by an edge node that has received a data packet, according to an embodiment.

FIG. 17 is a diagram illustrating an example of an operational flowchart for a process executed by an edge node that has received a data packet, according to an embodiment.

In operation S01, the process depicted in FIG. 17 is initiated when the switch card 52 receives a data packet that is received from a network via an interface card 54 of the edge node 20.

In operation S02, upon receiving the data packet, the switch card 52 (serving as the packet transfer unit 62) searches the routing table 66 for an entry corresponding to the destination IP address set in the data packet. When a corresponding entry is found (YES in operation S02), the transfer destination information corresponding to the destination IP address stored in the entry is used to transfer the data packet to an interface card 54 corresponding to the forwarding destination information and the data packet is transmitted to the network via the interface card 54 (in operation S03).

In contrast, when no entries storing transfer destination information corresponding to the destination IP address are found (NO in operation S03), the process proceeds to operation S04.

In operation S04, the switch card 52 provides the CPU 51 with a message requesting the generation of a LOC request for resolving a LOC corresponding to the destination IP address. Then, the CPU 51 generates the LOC request on the basis of the request from the switch card 52 and sends the generated LOC request to the interface card 54 coupled to the corresponding management server 40, where the destination address and the address of an edge node that has originated the LOC request are stored in the generated LOC request message. Upon receiving the LOC request, the interface card 54 serves as the LOC request transmitter 69 and transmits the LOC request over the network to the management server 40.

Figure 18:
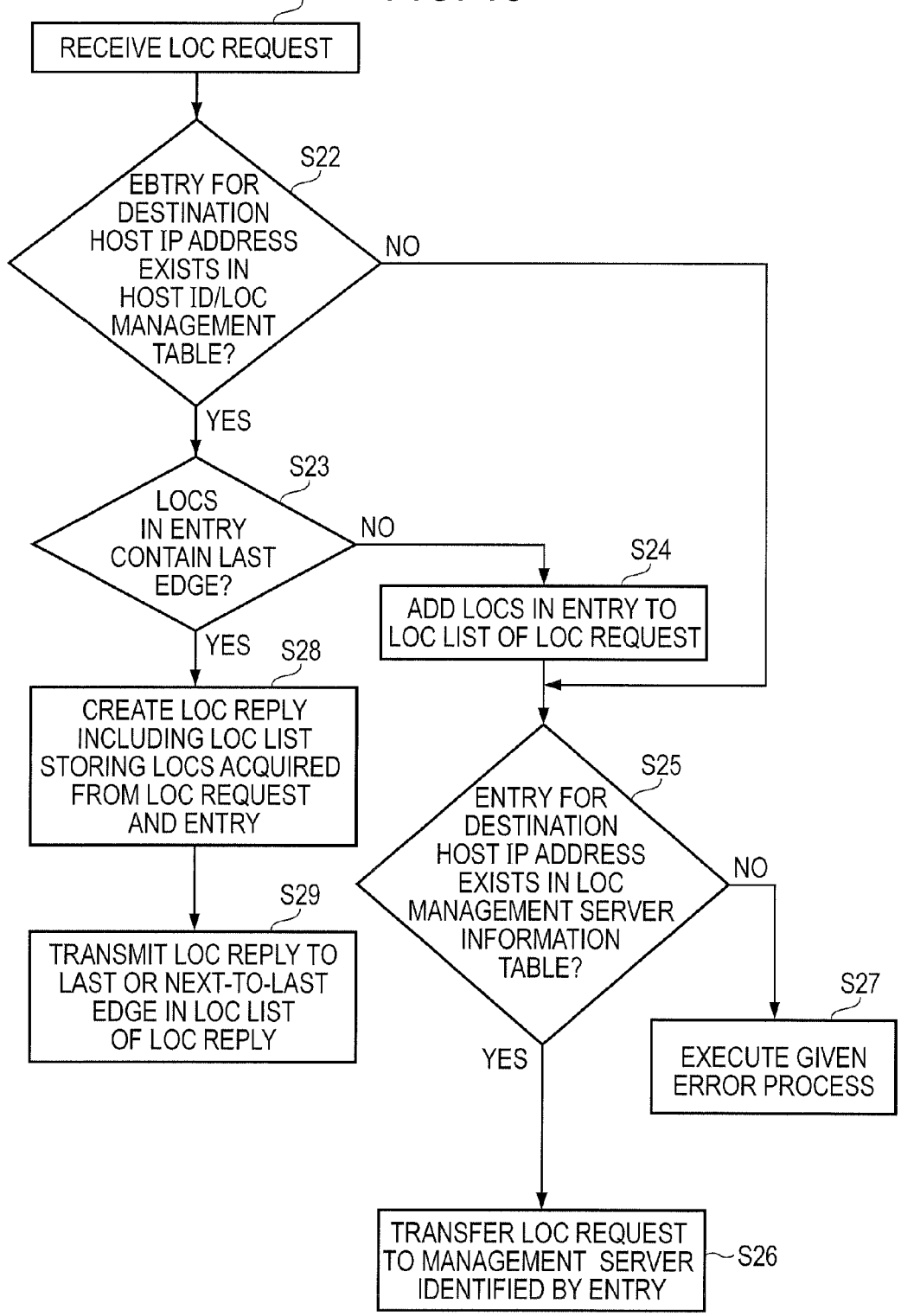
FIG. 18 is a diagram illustrating an example of an operational flowchart for a process performed by a management server that has received a LOC request, according to an embodiment.

FIG. 18 is a diagram illustrating an example of an operational flowchart for a process performed by a management server that has received a LOC request, according to an embodiment.

In operation S21, the process illustrated in FIG. 18 are initiated when the CPU 81 receives a LOC request that is sent to the CPU 81 from the network interface 84 (serving as the LOC request receiver 85) that has received the LOC request over the network.

In operation S22, the CPU 81 functions as the LOC request processor 86 to perform the following process. That is, the CPU 81 searches the host ID/LOC management table 90 (see FIG. 9) for an entry corresponding to the destination IP address included in the LOC request. When the corresponding entry is found (YES in operation S22), the CPU 81 determines whether or not the edge node list (i.e., LOC list) stored in the found entry contains an address of an edge node at the lowermost layer (i.e., a leaf or last edge) (in operation S23).

When a last edge is not included (NO in operation S23), the CPU 81 adds the one or more LOCs (i.e., edge node addresses) included in the LOC list stored in the found entry to the LOC request (in operation S24).

In operation S25, the CPU 81 searches the LOC management server information table 89 (see FIG. 8) for an entry corresponding to the destination IP address in the LOC request.

When the corresponding entry is found (YES in operation S25), the process proceeds to operation S26.

In operation S26, the CPU 81 transfers the LOC request to the management server address indicated by the entry. In other words, a LOC request, in which the destination IP address is set at the management server address obtained from the LOC management server information table 89, is forwarded from the CPU 81 to the corresponding interface card 54 and transmitted from the interface card 54 over the network to the next management server 40.

In contrast, when a corresponding entry is not found (NO in operation S25), it is determined that the destination IP address included in the LOC request does not exists, and a given error process is performed (in operation S27).

Meanwhile, when it is determined that a last edge is included in the LOC list (YES in operation S23), the process proceeds to operation S28.

In operation S28, the CPU 81 generates a LOC reply. At this point, the destination IP address, the address of an edge node that has originated the LOC request, the one or more LOCs (i.e., edge node addresses) that were stored in the LOC list contained in the LOC request, and the LOC list (i.e., edge node addresses) contained in the entry found in operation S22 are stored in the LOC reply by the CPU 81.

In operation S29, the CPU 81 transmits the LOC reply to the last edge indicated by the LOC list included in the LOC reply, or to an edge node one hop before the last edge. In other words, the CPU 81 sends the LOC reply to the interface card 54 corresponding to the destination edge node 20, and the interface card 54 transmits the LOC reply over the network to the destination edge node 20.

Figure 19:
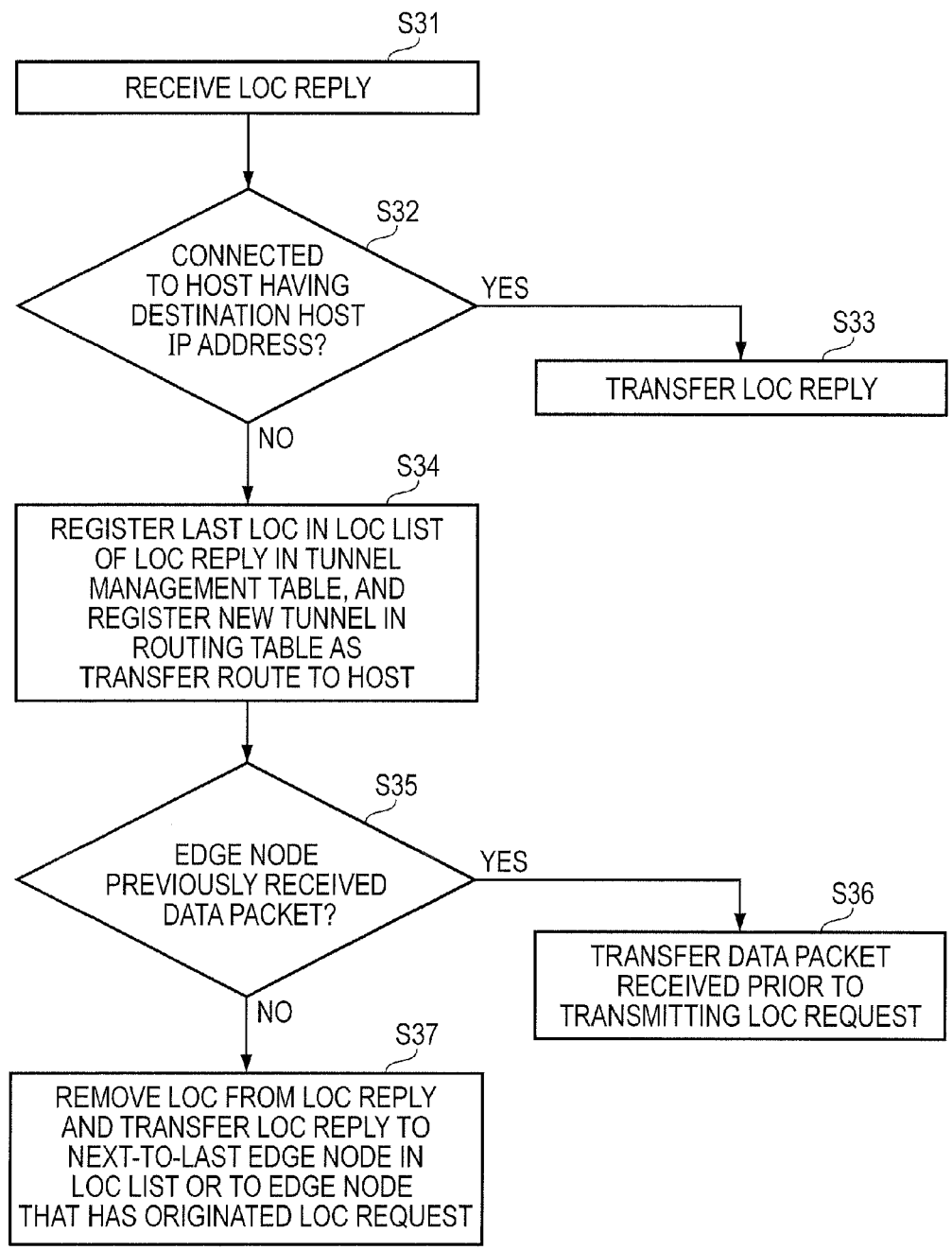
FIG. 19 is a diagram illustrating an example of an operational flowchart for a process executed by an edge node that has received a LOC reply, according to an embodiment.

FIG. 19 is a diagram illustrating an example of an operational flowchart for a process executed by an edge node that has received a LOC reply, according to an embodiment. Here, the edge node may be any of the edge nodes 21 to 27 that has received a LOC reply.

In operation S31, the process depicted in FIG. 19 are initiated when the CPU 51 of the edge node 20 receives a LOC reply via an interface card 54 of the edge node 20.

In operation S32, upon receiving the LOC reply, the CPU 51 of the edge node 20 determines whether or not the edge node 20 is being connected to a host having the destination IP address (i.e., the destination host IP address in the LOC request), by referring to information registered in the routing table 66 (see FIG. 4) included in the switch card 52 (i.e. the registered information is obtained from the switch card 52). When such a host is being connected to the edge node 20 (YES in operation S32), the CPU 51 transfers the LOC reply to another edge node 20 positioned at an upper layer (in operation S33). For example, when the edge node 22 receives a LOC reply from the management server 44, the edge node 22 transfers the LOC reply to the upper layer edge node 27. In other words, the process proceeds to operation S33 when the host is actually being connected to the edge node, and otherwise the process proceeds to operation S34. Here, in the case where the edge node 20 is a last node (for example, the edge node 22), an error process is performed instead of the operation S34 when the host is not being connected to the edge node (the last node).

In operation S32, when the destination IP address is not registered in the routing table 66 (NO in operation S32), the process proceeds to operation S34.

In operation S34, the CPU 51 functions as the tunnel generator 71. That is, the CPU 51 registers, in the tunnel management table 67 (see FIG. 5), an entry storing the LOC positioned at the end of the LOC list in the LOC reply in association with a tunnel number. Further, the CPU 51 registers, in the routing table 66 (see FIG. 4), an entry storing the tunnel number indicating the forwarding destination (i.e., the forwarding route) in association with a destination IP address "Host IP2". The process of registering entries in the routing table 66 and the tunnel management table 67 may be realized in such a manner that the CPU 51 issues registration commands for the above mentioned entries to the switch card 52, and the switch card 52 updates (i.e., registering the entries in) the routing table 66 and the tunnel management table 67.

In operation S35, the CPU 51 determines whether or not the current edge node is an edge node 20 that previously received a data packet from the host. When the current edge node is an edge node 20 that previously received the data packet (YES in operation S35), instructions are given to the switch card 52 for transferring the data packet that was received before transmitting the LOC request (in operation S36).

In operation S36, the switch card 52 functions as the packet transfer unit 62 and the encapsulation unit 65 to encapsulate the data packet (i.e., generate a LISP packet) based on the updated routing table 66 and tunnel management table 67, and forwards the generated LISP packet to an interface card 54 corresponding to the destination IP address (LOC). The interface card 54 transmits the LISP packet to the next hop edge node 20 coupled by the tunnel. Here, it is not mandatory to retain the packet until a LOC reply is received.

Meanwhile, when it is determined in operation S35 that the current edge node is not an edge node that received the data packet (NO in operation S35), the CPU 51 removes the LOC used in the registered entry from the LOC list in the LOC reply, and transfers the LOC reply to the edge node having the LOC positioned one hop before the LOC positioned last in the remaining LOC list (in operation S37). Here, when only one piece of LOC information is left in the LOC list as the result of removing the LOC used in the registered entry from the LOC list in the LOC reply, the LOC reply is transferred to an edge node that has originated the LOC request. At this point, the LOC reply is sent from the CPU 51 to an interface card 54, and transmitted from the interface card 54 over the network.

Hereinafter, description will be given of operational example 1 for the network illustrated in FIG. 10. Herein it is assumed that the management servers 41 to 44 have the table entries illustrated in FIGS. 11 to 16, the respective edge nodes 21 to 27 perform the processes illustrated in FIGS. 17 and 19, and the respective management servers 41 to 44 perform the process illustrated in FIG. 18.

<<Phase 1>>

The host 31 transmits a user data packet (which will be simply expressed as "packet" in the following operational example) in which the destination IP address "Host IP2" is set (FIG. 10, operation (1)). The packet is received by the edge node 21.

<<Phase 2>>

Upon receiving the packet, the edge node 21 references the routing table 66 and identifies a transfer route corresponding to the destination IP address "Host IP2" of the packet. However, when the packet addressed to the host 32 firstly arrives at the edge node 21, the routing table 66 is not storing transfer information for "Host IP2". In other words, a transfer route corresponding to "Host IP2" does not exist. In this case, the edge node 21 generates a LOC request for resolving a LOC corresponding to "Host IP2", and transmits the generated LOC request to the management server 41 (FIG. 10, operation (2)), where the destination IP address "Host IP2" and the address "LOC1" of the edge node that has originated the LOC request are stored in the generated LOC request.

<<Phase 3>>

Upon receiving the LOC request, the management server 41 references the LOC management server information table 89 (see FIG. 11). In the case, the IP address of the management server 42 is registered in the LOC management server information table 89 in association with "Host IP2" included in the LOC request. Therefore, the management server 41 transfers the LOC request to the management server 42 (FIG. 10, operation (3)). Here, it is also possible to configure a system in which the address of a relay server that transfers a LOC request to a management server is registered in a LOC management table instead of a management server address, and in which the relay server relays a LOC request addressed to the management server.

<<Phase 4>>

Upon receiving the LOC request, the management server 42 references the host ID/LOC management table 90 (see FIG. 14) and checks if an edge node to be traversed by a packet addressed to "Host IP2" is being managed. In other words, the management server 42 searches the host ID/LOC management table 90 for an entry associated with the destination host IP address "Host IP2" included in the LOC request. As illustrated in FIG. 14, an entry associated with "Host IP2" is being registered in the host ID/LOC management table 90, and the entry is found as the search result.

The management server 42 references, in the found entry, information indicating whether or not the LOC list includes a last edge (also expresses as "last-edge information"). Hereinafter, in the last-edge information, a value indicating that a last edge is included in the LOC list will be expressed as "Yes", and a value indicating that a last edge is not included in the LOC list will be expressed as "No". In this case, since the last-edge information has a value "No", the management server 42 stores, in the LOC request, "LOC5" (the IP address of the edge node 25) being registered as the edge node list (LOC list) of the entry.

Next, the management server 42 searches the LOC management server information table 89 (see FIG. 12). In the case, an entry registering the IP address of the management server 43 as the transfer destination for "Host IP2" is found as the search result. The management server 42 transfers the LOC request to the management server 43 in accordance with the found entry (FIG. 10, (4)).

<<Phase 5>>

Upon receiving the LOC request, the management server 43 operates in a manner similar to the management server 42. That is, the management server 43 references the host ID/LOC management table 90 (see FIG. 15), and thereby adds the IP address "LOC6" of the edge node 26 to the LOC list in the LOC request. As a result, the LOC list in the LOC request includes LOC5 and LOC6. Further, the management server 43 references the LOC management server information table 89 (see FIG. 13), and thereby transfers the LOC request to the IP address of the management server 44 corresponding to the destination IP address "Host IP2" (FIG. 10, operation (5)).

<<Phase 6>>

Upon receiving the LOC request, the management server 44 searches the host ID/LOC management table 90 (see FIG. 16) in a manner similar to the management servers 42 and 43. In the case, an entry associated with "Host IP2" is found as the search result, and the last-edge information has a value "Yes" in the found entry (see FIG. 16). Therefore, the management server 44 generates a LOC reply that includes the address of the edge node that has originated the LOC request, all the LOCs that were included in the LOC list in the LOC request, and all the LOCs included in the LOC list in the found entry. Consequently, for example, the generated LOC reply includes a LOC list that contains "LOC5", "LOC6", "LOC7", and "LOC2". In the embodiment, plural LOCs are stored in the LOC list in the order of arrangement of the corresponding edge nodes in a tree topology from the root to the leaf.

The management server 44 transmits the generated LOC reply to an edge node 20 that is the last edge (for example, the edge node 22), or to an edge node 20 that is positioned one hop before the last edge in the tree topology (for example, the edge node 27), in accordance with preset recipient information for a LOC reply. Here, the recipient information for a LOC reply may be stored in advance in auxiliary storage such as the HDD 83. The recipient information may be, for example, stored in an entry of the host ID/LOC management table 90 that stores last-edge information having value "Yes" indicating a last edge. Subsequent operation will be described using an example in which the LOC reply is transmitted to the edge node 27 (FIG. 10, operation (6)).

<<Phase 7>>

Upon receiving the LOC reply, the edge node 27 registers the LOC positioned last in the LOC list included in the LOC reply (for example, LOC2), in the tunnel management table 67 of the edge node 27. For example, "LOC2" may be registered in association with the tunnel number "1". FIG. 20 illustrates an entry registered in the tunnel management table 67 of the edge node 27.

Further, the edge node 27 registers, in the routing table 66 of the edge node 27, an entry indicating that a transfer route for packets addressed to "Host IP2" is a tunnel having the tunnel number "1" (tunnel 1). FIG. 21 illustrates an entry registered in the routing table 66 of the edge node 27. Thus, a packet addressed to "Host IP2" (the host 32) that has been received by the edge node 27 may be transferred through the tunnel 1 by encapsulating the packet with a header added to the beginning of the packet where the edge node address "LOC2" is set to the header as the destination IP address.

The edge node 27 removes "LOC2" from the LOC list in the LOC reply, and the one or more LOCs remaining in the LOC list become "LOC5", "LOC6", and "LOC7". The edge node 27 transfers the LOC reply to the edge node 26 identified by a LOC ("LOC6") positioned one hop before "LOC7" in the LOC list (FIG. 10, operation (7)).

<<Phase 8>>

Upon receiving the LOC reply, the edge node 26 performs a process similar to that of the edge node 27. That is, the edge node 26 registers, in the tunnel management table 67 of the edge node 26, an entry storing the tunnel number "1" in association with "LOC7". FIG. 22 illustrates the entry registered in the tunnel management table 67 of the edge node 26. The edge node 26 also registers, in the routing table 66 of the edge node 26, an entry storing the tunnel number "1" in association with the host IP address "Host IP2" (see FIG. 21). The edge node 26 then removes "LOC7" positioned last in the LOC list in the LOC reply, and transmits the LOC reply including a LOC list of "LOC5" and "LOC6" to the edge node 25 identified by a LOC ("LOC5") positioned one hop before "LOC6" in the LOC list (FIG. 10, operation (8)).

<<Phase 9>>

Upon receiving the LOC reply, the edge node 25 operates in a manner similar to the edge nodes 27 and 26. That is, the edge node 25 registers, in the tunnel management table 67 of the edge node 25, an entry storing the tunnel number "1" in association with "LOC6". FIG. 23 illustrates the entry registered in the tunnel management table 67 of the edge node 25. The edge node 25 also registers, in the routing table 66 of the edge node 25, an entry storing the tunnel number "1" in association with the host IP address "Host IP2" (see FIG. 21). The edge node 25 then removes "LOC6" positioned last in the LOC list in the LOC reply. In this case, since only one piece of LOC information is left in the LOC reply, the edge node 25 transmits the LOC reply including a LOC list of "LOC5" to the edge node 21 (having address "LOC1") that has originated the LOC request (FIG. 10, operation (9)).

<<Phase 10>>

Upon receiving the LOC reply, the edge node 21 operates in a manner similar to the edge nodes 27, 26, and 25. That is, the edge node 21 registers, in the tunnel management table 67 of the edge node 21, an entry storing the tunnel number "1" in association with "LOC5". FIG. 24 illustrates the entry registered in the tunnel management table 67 of the edge node 21. The edge node 21 also registers, in the routing table 66 of the edge node 21, an entry storing the tunnel number "1" in association with the host IP address "Host IP2" (see FIG. 21).

Thus, series-connected tunnels traversing the edge node 25, the edge node 26, and the edge node 27 is constructed between the edge node 21 accommodating the host 31 and the edge node 22 accommodating the destination host 32 (FIG. 10, operation (10)). As described above, series-connected tunnels may be managed using the same tunnel number, and a data packet that has been received by the edge node 21 in the phase 2 may be transferred to the edge node 22 using the series-connected tunnels.

<<Phase 11>>

In the following phases 11 to 15, description will be given of an operational example in which a first packet addressed to "Host IP2" that was not transferred in Phase 2 and a second packet addressed to "Host IP2" that is subsequently transferred from the host 31 to the edge node 21 are transferred using a plurality of tunnels that were established in Phases 2 to 10 and are connected in series (series-connected tunnels).

The edge node 21 identifies a transfer route to "Host IP2" by referencing the routing table 66 of the edge node 21 (see FIG. 21). In the routing table 66, the tunnel 1 is registered as the transfer route to "Host IP2". Further, "LOC5" for transferring packets to "Host IP2" via the tunnel 1 is registered in the tunnel management table 67 of the edge node 21 (see FIG. 24). Consequently, the edge node 21 encapsulates (i.e., generates a LISP packet for) a packet received from the host 31 by adding a header storing "LOC5" as the destination edge node address, and transfers the encapsulated packet to a next edge node 25 (FIG. 10, operation (11)).

<<Phase 12>>

Upon receiving the encapsulated packet (i.e., LISP packet), the edge node 25 removes the header added to the beginning of the LISP packet (decapsulation). Subsequently, the edge node 25 searches the routing table 66 of the edge node 25 (see FIG. 21) for an entry corresponding to the destination IP address "Host IP2" of the original packet.

In the routing table 66 of the edge node 25, the tunnel 1 is registered as the transfer route to "Host IP2". Further, "LOC6" for transferring packets to "Host IP2" via the tunnel 1 is registered in the tunnel management table 67 of the edge node 25 (see FIG. 23). Consequently, the edge node 25 encapsulates (i.e., generates a LISP packet for) the original packet by adding a header storing "LOC6" as the destination edge node address to the beginning of the original packet, and transfers the encapsulated packet to a next edge node 26 (FIG. 10, operation (12)).

<<Phase 13>>

Upon receiving the encapsulated packet (i.e., LISP packet), the edge node 26 operates in a manner similar to the edge node 25. That is, the edge node 26 removes the header added to the beginning of the LISP packet (decapsulation). Subsequently, the edge node 26 searches the routing table 66 of the edge node 26 (see FIG. 21) for a tunnel number corresponding to the destination IP address "Host IP2" of the decapsulated packet (the original packet).

"Tunnel 1" is found as the result of searching for a transfer route to "Host IP2". Further, "LOC7" corresponding to "Host IP2" is found as the result of searching the tunnel management table 67 of the edge node 26 (see FIG. 22). Consequently, the edge node 26 encapsulates (i.e., generates a LISP packet for) the original packet by adding a header storing "LOC7" as the destination edge node address to the beginning of the original packet, and transfers the encapsulated packet to a next edge node 27 (FIG. 10, operation (13)).

<<Phase 14>>

Upon receiving the encapsulated packet (the LISP packet), the edge node 27 operates in a manner similar to the edge nodes 25 and 26. That is, the edge node 27 removes the header added to the beginning of the LISP packet (decapsulation). Subsequently, the edge node 27 searches the routing table 66 thereof (see FIG. 21) for a tunnel associated with the destination IP address "Host IP2" of the decapsulated packet (the original packet).

"Tunnel 1" is found as a transfer route to "Host IP2". Further, "LOC2" corresponding to "Host IP2" is found as the result of searching the tunnel management table 67 of the edge node 27 (see FIG. 20). Consequently, the edge node 27 encapsulates (i.e., generates a LISP packet for) the original packet by adding a header storing "LOC2" as the destination edge node address to the beginning of the original packet, and transfers the encapsulated packet to a next edge node 22 (FIG. 10, operation (14)).

<<Phase 15>>

Upon receiving the encapsulated packet (i.e., LISP packet), the edge node 22 removes the header added to the beginning of the LISP packet (decapsulation). Subsequently, the edge node 22 searches the routing table 66 thereof for a transfer destination corresponding to the destination IP address "Host IP2" of the decapsulated packet (the original packet).

In the routing table 66 of the edge node 22, the address "Host IP2" of the host 32 or the IP address of the next hop router that transfers packets to "Host IP2" is registered as a transfer destination corresponding to "Host IP2". Consequently, the edge node 22 transfers the packet towards the host 32 in a manner similar to the ordinary routing (FIG. 10, operation (15)).

As mentioned above, in the core network 10, the receiving of a packet from the host 31 triggers the establishment of series-connected tunnels in which the ingress edge node 21 and the egress edge node 22 of the core network 10 are coupled via a plurality of relay edge nodes 25, 26, and 27. The established series-connected tunnels are then used to transfer the packet to the destination host 32.

According to the operational example 1, it is possible, with a single LOC request, to construct series-connected tunnels traversing one or more relay edge nodes between an ingress edge node and an egress edge node accommodating respective hosts. Thus, it is possible to reduce the processing load and processing time compared to the case where an edge node at the starting point of each of tunnels transmits a LOC request to a management server 40.

<Operational Example 2>

Next description will be given of an operational example 2 in which the host 31 transmits a packet to the host 33 connected to the edge node 23. In the operational example 2, upon receiving a packet addressed to the host 33 ("Host IP3"), the edge node 21 transmits a LOC request to the management server 41 so as to resolve a LOC associated with "Host IP3", in a manner similar to the operational example 1.

The LOC request is transferred among management servers in the order of the management server 42, 43, and 44, in accordance with information registered in the host ID/LOC management tables 90 and the LOC management server information tables 89 of the management servers 41 to 44 (see FIGS. 11 to 16). During the above transfer of the LOC request, "LOC5" and "LOC6" are registered in the LOC list included in the LOC request. Thereafter, at the management server 44, a LOC reply including a LOC list storing "LOC5", "LOC6", "LOC7", and "LOC3" is transmitted to the edge node 23 or 27. In the following description, an example in which the LOC reply is transmitted to the edge node 27 will be described.

Upon receiving the LOC reply, the edge node 27 generates a new tunnel, by adding entries to the routing table 66 and tunnel management table 67 thereof in a manner similar to the operational example 1. FIG. 25 illustrates entries registered in the routing table 66 of the edge node 27, and FIG. 26 illustrates entries registered in the tunnel management table 67 of the edge node 27. As illustrated in FIG. 25, an entry storing the tunnel number "2" (i.e., the tunnel 2) in association with "Host IP3" is added to the routing table 66, and as illustrated in FIG. 26, an entry storing the edge node address "LOC3" in association with the tunnel number "2" is registered in the tunnel management table 67.

The LOC reply is transferred among edge nodes in the order of the edge node 27, 26, 25, and 21. Herein, the tunnel 1 to the lower layer edge node is already registered in each of the edge nodes 26, 25, and 21. For this reason, the edge nodes 26, 25, and 21 use the registered tunnels 1 to transfer data, without generating a new tunnel. Thus, as illustrated in FIG. 27, the edge nodes 26, 25, and 21 register transfer destination information "Tunnel 1" in association with "Host IP3" in the respective routing tables 66 thereof. FIG. 27 illustrates the entries in the routing table 66 of each of the edge nodes 21, 25, and 26.

According to the operational example 2, in the case of constructing a new tunnel to a host (host 33) accommodated by an egress edge node (edge node 23) that is reached via a route that branches out halfway from an existing series-connected tunnel, a new tunnel (tunnel 2) is constructed between the edge node at the branch point (in the case, edge node 27) and the egress edge node corresponding to the host 33 (edge node 23), and the existing tunnel (tunnel 1) is used upstream from the branch point (i.e., among edge node 25, 26, and 27). This allows reducing the time and processing load needed for constructing a tunnel.

<Operational Example 3>

Assume the case where, after the operational example 1 has been completed, the host 32 moves such that an access network to which the host 32 belongs changes from the access network 12 to the access network 13, and the host 32 becomes accommodated by the edge node 23. In this case, the edge nodes 22 and 23 are able to recognize the movement of the host 32 using the known techniques (such as by using Open Shortest Path First (OSPF) Hello packets or by using ping messages).

In the case, the edge node 22 transmits, to the edge node 27, a LOC change request caused by the absence of the host 32. Then, the CPU 51 of the edge node 27 stops transmitting packets addressed to "Host IP2" to the edge node 22. Subsequently, the CPU 51 of the edge node 27 queries the edge nodes 23 and 24 that are positioned in the same layer as the last edge of the edge node tree (i.e., the edge node 22), whether or not the respective edge node 23 and 24 are accommodating "Host IP2" (for example, by creating and transmitting query messages). Here, it is assumed that the addresses of the edge nodes 23 and 24 are stored in advance in the storage 53 of the edge node 27.

The edge nodes 23 and 24 each transmit a ping message addressed "Host IP2" and wait for an echo reply message. On the basis of whether a reply message is received or not, the edge nodes 23 and 24 each transmit a message replying to the query (a message indicating whether "Host IP2" is present or not) to the edge node 27.

Upon receiving reply messages from the edge nodes 23 and 24, the edge node 27 is able to recognize whether or not the host 32 is being accommodated by the edge node 23 or 24, respectively. In the operational example 3, the host 32 is connected to the edge node 23, and the edge node 27 is able to recognize that the host 32 is connected to the edge node 23 according to the reply message from the edge node 23.

The CPU 51 of the edge node 27 then performs processing for changing an egress edge node (i.e., the last edge) for the host 32, from the edge node 22 to the edge node 23 (i.e., a tunnel from the edge node 27 towards the host 32 is reconstructed). That is, the edge node 27 replaces the entry storing "Tunnel 1" and "LOC2" in the tunnel management table 67 thereof (see FIG. 20) with an entry storing a new tunnel number "2" (i.e., the tunnel 2) and "LOC3". Further, the edge node 27 replaces the entry storing the "Host IP2" and "Tunnel 1" in the routing table 66 (see FIG. 21) with an entry storing "Host IP2" (unchanged) and "Tunnel 2". The above mentioned replacements of the entries in the routing table 66 and tunnel management table 67 are invoked when the CPU 51 issues replacement instructions to the switch card 52. In this way, a tunnel 2 for transferring packets addressed to the host 32 that has moved to the access network 13 is constructed in the lower layers of the edge node 27.

When the above mentioned updating of the routing table 66 and tunnel management table 67 is complete, the CPU 51 of the edge node 27 issues a resume instruction for resuming packet transmission to the switch card 52. In accordance with the resume instruction, the switch card 52 transmits a LISP packet to the edge node 23. The LISP packet encapsulates a packet addressed to "Host IP2" with a header addressed to "LOC3", on the basis of information registered in the updated routing table 66 and tunnel management table 67. In this way, when the access network to which the host 32 belongs has changed, only a tunnel to be arranged below the edge node that is positioned one layer above the last edge (i.e., the edge node 27) is reconstructed. This allows reducing the time needed for reconstructing a tunnel, thereby also reducing the time during which data transfer is suspended due to the change of access network.

<Operational Example 4>

Assume the case where, after the operational example 2 has been completed, the host 32 moves from the access network 12 to the access network 13, and an egress edge node (i.e., a last edge) changes from the edge node 22 to the edge node 23. In a manner similar to the operational example 3, the edge node 22 transmits a LOC change request to the edge node 27, the edge node 27 queries the edge nodes 23 and 24, and the edge node 27 recognizes, from the reply messages, that the host 32 is connected to the edge node 23.

However, in the operational example 4, a tunnel coupling the edge node 27 and the edge node 23 (i.e., "Tunnel 2") has already been constructed due to the operations performed in the operational example 2 (see FIGS. 25 and 26). For this reason, the CPU 51 of the edge node 27 provides the switch card 52 with a rewriting instruction for removing the entry storing the "Tunnel 1" associated with "LOC2" from the tunnel management table 67, and also provides the switch card 52 with a rewriting instruction for replacing the entry storing "Host IP2" and "Tunnel 1" in the routing table 66 (see FIG. 25) with an entry storing "Host IP2" and "Tunnel 2". The switch card 52 updates the routing table 66 and the tunnel management table 67 of the edge node 27 in accordance with the rewriting instructions. As a result, tunnels 1 from the edge node 21 to the edge node 27 and tunnel 2 from the edge node 27 to the edge node 23 are constructed, in a manner similar to the operational example 3. Thereafter, the edge node 27 resumes transfer of packets addressed to "Host IP2", in a manner similar to the operational example 3.

<Advantages of the First Embodiment>

According to the operational example 1 according to the first embodiment, a plurality of series-connected tunnels coupling the ingress edge node 21 with the egress edge node 22 is constructed at one time when the ingress edge node 21 of the core network 10 transmits a LOC request to the management server 41 so as to initiate host-to-host communication. Therefore, it is possible to reduce the processing load in each edge node and the time needed for constructing tunnels compared to the case where each of the edge nodes 21, 25, 26, and 27 transmits a LOC request to the corresponding management server 40 in order to construct tunnels to a lower layer edge node 20. Further, it is also possible to reduce the time during which the transfer of packets to the host 32 (i.e., to "Host IP2") is suspended in the edge node 21.

Further, according to the operational example 2, under the condition that a multi-hp tunnel to a first host being established, when constructing a tunnel to a second host having a common ingress edge node but an egress edge node different from that for the first host (i.e., the host 33), only a tunnel arranged below the edge node 27 positioned at the branch point of the edge node tree (i.e., a tunnel between the edge node 27 and the edge node 23) is newly constructed. Thus, it is possible to reduce the time needed for constructing a tunnel as well as the processing load at each edge node 20.

Further, according to the operational examples 3 and 4, when the host 32 moves, it is possible to appropriately transfer packets to the moved host 32 by rewriting the routing table 66 and the tunnel management table 67 of the edge node 27. For example, the operational examples 3 and 4 yield the following advantages.

Figure 28:
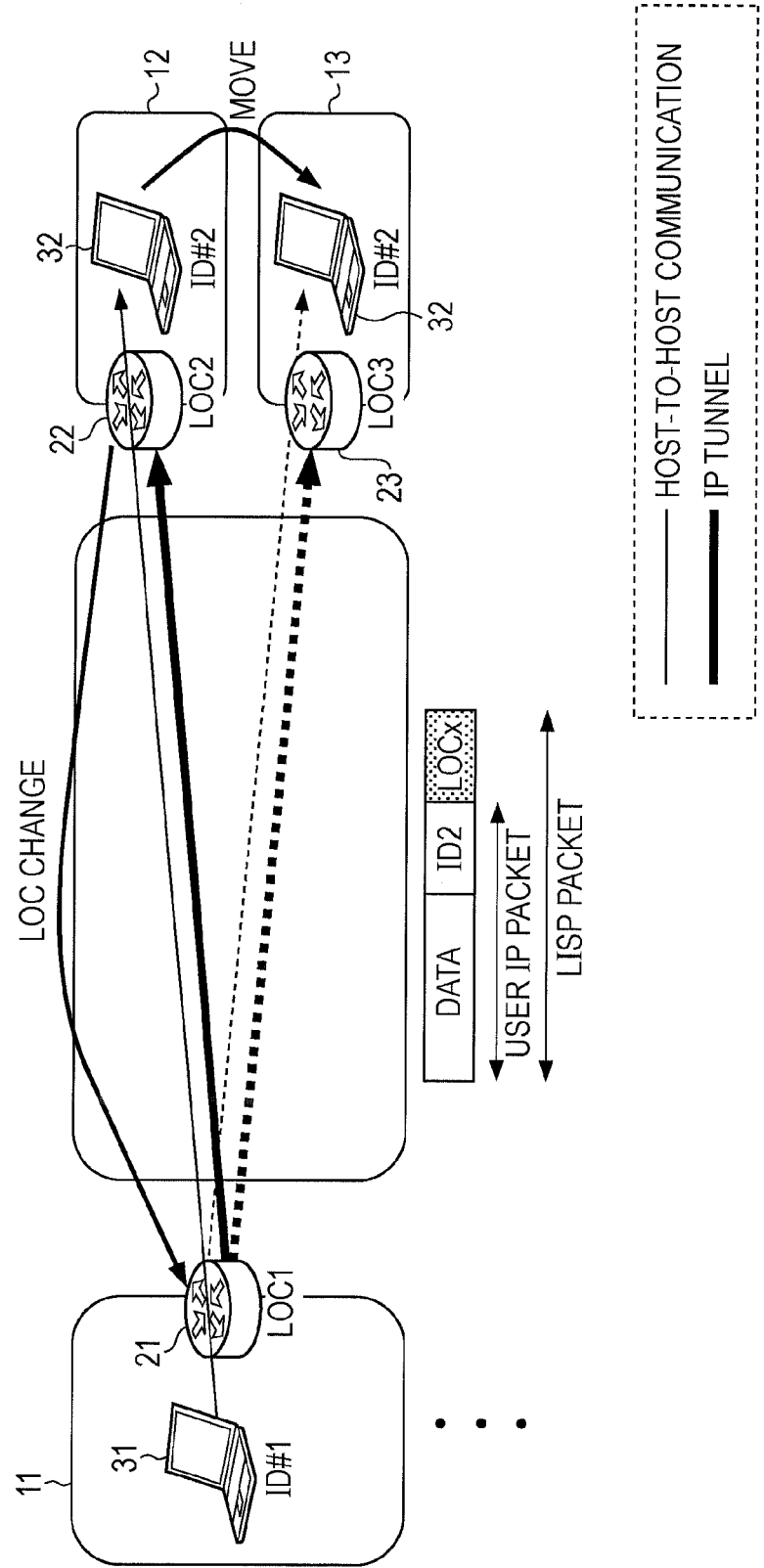
FIG. 28 is a schematic diagram illustrating an example of establishing a tunnel.

Assume the case where a tunnel between the edge nodes 21 and 22 is constructed for communication between the hosts 31 and 32, as illustrated by a schematic diagram in FIG. 28. Further, it is assumed that the host 32 moves from the access network 12 to the access network 13, and an edge node to which the host 32 is connected changes from the node 22 to the edge node 23.

According to the prior art, the edge node 22 notifies the edge node 21 of the LOC change, and the edge node 21 reconstructs a tunnel to the edge node 23, thereby allowing packet transfer to the host 32 to be continued. In this case, the packet transfer to the host 32 ceases while the edge node 22 notifies the edge node 21 of LOC change and a tunnel is reconstructed. The time during which packet transfer is suspended increases with increasing distance between the edge node 21 and the edge node 22.

Meanwhile, according the operational examples 3 and 4, an edge node 27 that is closer to the edge node 22 than the edge node 21 is notified of the LOC change, thereby reducing the time during which packet transfer is suspended.

Furthermore, even in the case where the host 32 communicating with the host 31 moves from the access network 12 to the access network 13 and then to the access network 14, and where an edge node to which the host 32 is connected changes from the edge node 22 to the edge node 23 and then to the edge node 24, processing on the tunnel reconstruction is performed by rewriting the routing table 66 and the tunnel management table 67 of only the edge node 27. Consequently, lengthy suspension of packet transfer may be suppressed, and the continuation of smooth communication may be anticipated.

<Modification 1>

According to the operational examples 1 and 2, the management server 44 transmits a LOC reply to an edge node (for example, the edge node 27) one hop before the last edge (the edge nodes 22 and 23). As a result, processing at the last edge is omitted, thus making it possible to reduce the processing load at the last edge while shortening the processing time for establishing a tunnel.

However, as discussed earlier, it is also possible to implement a configuration in which a management server 40 transmits a LOC reply to the last edge. In this case, the last edge receiving the LOC reply transfers the LOC reply, as indicated in operation S33 of FIG. 19, to an edge node having a LOC next higher than that of the last edge in the LOC list of the LOC reply, without modifying the LOC reply. This configuration has an advantage in that the edge node of the last edge is able to confirm whether or not the destination host is being connected thereto, and to set quality of service (QoS) controls for packets received through the tunnel.

<Modification 2>

In the example illustrated in FIGS. 1 and 10, the management server 44 in the lowermost layer of the tree topology of the management servers 40 manages edge nodes in plural layers of the edge node tree (i.e., the edge nodes 27, 22, and 23). However, it is also possible to modify the configuration of the first embodiment such that the management servers 40 positioned in the uppermost or middle layers of the tree topology of management servers 40 manage edge nodes in plural layers.

For example, in the case where the management server 43 does not exist and the management server 42 manages the edge node 25 and the edge node 26, the management server 42 stores the LOC management server information table 89 illustrated in FIG. 29 and the host ID/LOC management table 90 illustrated in FIG. 30. As illustrated in FIG. 29, the LOC management server information table 89 stores the IP address of the management server 44 for both "Host IP2" and "Host IP3". Also, as illustrated in FIG. 30, the host ID/LOC management table 90 stores a LOC list that include "LOC5" and "LOC6" for each of "Host IP2" and "Host IP3".

In the modification 2, the following operations are performed in the above mentioned phase 4. That is, upon receiving a LOC request, the CPU 81 of the management server 42 searches the host ID/LOC management table 90 (see FIG. 30) for an entry corresponding to "Host IP2". When the entry is found, the CPU 81 of the management server 42 acquires the LOC list ("LOC5, LOC6") from the found entry. Since the last-edge information is "No" in the found entry, the CPU 81 of the management server 42 transfers a LOC request storing LOC5 and LOC6 to the IP address of the management server 44 that is found in a search of the LOC management server information table 89 (see FIG. 29).

According to the modification 2, the number of management servers 40 for processing LOC requests may be decreased, thereby reducing the time needed for constructing series-connected tunnels.

(Second Embodiment)

Next, description will be given of a second embodiment. Since the second embodiment shares some features in common with the first embodiment, the differences will be primarily described, and the detailed description of the shared features will be reduced or omitted. As an operational example of the second embodiment, description will be given of the case where the host 33 transfers a packet to the host 32 in the network system illustrated in FIG. 1. Ordinarily, the IP address of the management server 40 (in the case, the management server 42) managing the edge node (in the case, the edge node 25) at the root of the edge node tree is registered in the LOC management server information table 89 of the ingress edge node (in the case, the edge node 23) connected to the transmitting host (in the case, the host 33). For this reason, transferred packets traverse the root edge node 20 (the edge node 25), even for communication between leaves of the edge node tree. This is because packet transfer over the core network 10 is controlled by regarding the root of the edge node tree as a base point of the packet transfer.

In the second embodiment, a technique will be described in which an edge node 20 first references the host ID/LOC management table 90 to establish an efficient tunnel that does not traverse the root edge node 20 (i.e., the edge node 25), thereby enabling efficient packet transfer. In the following description, it is assumed that LOC management server information tables 89 and host ID/LOC management tables 90 like those illustrated in FIGS. 11 to 16 are stored in the management servers 41 to 44 in a manner similar to the operational example 1 of the first embodiment.

In the network system illustrated in FIG. 1, the host 33 transmits a packet addressed to the host 32 (i.e., the destination IP address is "Host IP2"). Upon receiving the packet addressed to "Host IP2", the edge node 23 references the routing table 66 and identifies a packet transfer route. In the case, when a packet addressed to "Host IP2" first reaches the edge node 23, an entry storing a transfer destination for packets addressed to "Host IP2" is not registered in the routing table 66 yet. For this reason, the edge node 23 transmits a LOC request for resolving a LOC corresponding to "Host IP2" to the management server 44.

Upon receiving the LOC request, the CPU 81 of the management server 44 references the host ID/LOC management table 90 of the management server 44 (see FIG. 16), and determines whether or not the LOC request was transmitted from an edge node under control of the management server 44. In the example in FIG. 16, an edge node list (i.e., LOC list) of "LOC1, LOC2" is registered in the host ID/LOC management table 90 in association with "Host IP2".

From the LOC list, the CPU 81 of the management server 44 extracts the LOC of the edge node closest to the destination host. In the example illustrated in FIG. 16, LOCs are registered in the LOC list of the entry in the order in which the corresponding edge nodes are arranged along the route from root to leaf. Consequently, "LOC2", which is positioned at the end of the LOC list, is the LOC of the edge node closest to the destination host (the host 32). The CPU 81 thus extracts "LOC2", generates a LOC reply storing the extracted "LOC2", and returns the generated LOC reply directly to the edge node 23 via the network interface 84.

Upon receiving the LOC reply, the edge node 23 registers, in the tunnel management table 67 thereof, an entry storing "LOC2" acquired from the LOC reply and a tunnel number corresponding to "LOC2". The CPU 51 of the edge node 23 also instructs the switch card 52 to register, in the routing table 66, an entry storing the edge node address "LOC2" as transfer route information corresponding to "Host IP2".

This allows a packet obtained from the host 33 and addressed to the host 32 ("Host IP2") to be transferred to the edge node 22 via a tunnel constructed between the edge nodes 23 and 22. In other words, the packet addressed to "Host IP2" is encapsulated with a header storing "LOC2", and the encapsulated packet (i.e., a LISP packet) may be transferred to the edge node 22. In the edge node 22, the LISP packet received from the edge node 23 is decapsulated, and the original packet (i.e. the decapsulated packet) is transferred to the host 32 according to an ordinary routing protocol.

According to the second embodiment, a management server 40 having received a LOC request from an edge node 20 under control thereof searches a host ID/LOC management table 90 for an entry corresponding to the host IP address (i.e., the destination host IP address) stored in the LOC request. When the corresponding entry is found, the LOC of the edge node 20 that is closest to the destination host is extracted from the LOC list in the entry, and a tunnel including an endpoint identified by the extracted LOC is constructed. This allows efficient packet transfer that does not traverse edge nodes 20 at the root or in the middle layers of the edge node tree.

Herein, it is preferable to use efficient transfer routes by taking into consideration how far each edge node 20 in the edge node tree is distanced from the destination host. For example, it is conceivable to establish a direct edge-to-edge tunnel between edge nodes 20 in the edge node tree only in the case where the last edge is included in the LOC list. Alternatively, it is also conceivable to select a technique that provides the host ID/LOC management table 90 with flag information indicating whether or not efficient transfer is possible, and constructs the above efficient transfer route only in the case where the flag information is set at ON.

(Third Embodiment)

Next, description will be given of a third embodiment. Since the third embodiment shares some features in common with the first embodiment, the differences will be primarily described, and the detailed description of the shared features will be reduced or omitted.

In the exemplary network system illustrated in FIG. 1, the edge node tree has four layers: an uppermost layer (the edge node 25), an upper layer (the edge node 26), a lower layer (the edge node 27), and a lowermost layer (the edge nodes 22, 23, and 24).

When the host 31 transfers a packet to the host 32 over the above network, it is nit required that a packet transfer route over the core network 10 every time traverses edge nodes 20 in all the layers. For example, when host movement like that described in the first embodiment occurs frequently, or when host move over a wide range, it is conceivable to determine a transfer route such that the packet transfer route traverses edge nodes 20 in all the layers. Meanwhile, when host movement does not occur frequently, or when communication of low-latency transfer achieved by reducing the number of traversed edge nodes 20 is preferable to temporary disconnections due to host movement, it may be possible in some cases to establish a direct tunnel between the ingress edge node (LOC1.) and the lowermost layer edge node (LOC2.). Alternatively, it may be preferable in some cases to select transfer routes that reflect a balance between efficient switchover processing during host movement and low-latency transfer, such that the selected transfer routes traverse edge nodes 20 in some, but not all, layers between LOC1 and LOC2. The following techniques are conceivable for realizing the above.

(Method 1-1)

When a management server 40 that has received a LOC request (i.e., one of the management servers 41 to 44 in the first embodiment) transfers the LOC request to another management server 40 positioned in a lower layer according to the destination IP address of the host stored in the LOC request (i.e., the destination host IP address), the management server 40 determines whether or not to add, to the LOC list included in the LOC request, the LOCs of one or more edge nodes 20 being managed by the management server 40 (e.g., the edge node 25 in the case of the management server 42, or more specifically, the edge node 25 having the LOC stored in the LOC list of the host ID/LOC management table 90 included in the management server 42). For example, the management server 40 determines to add one or more LOCs in the case where efficient tunnel switchover is prioritized when the destination host is moving. Meanwhile, for example, the management server 40 determines not to add one or more LOCs when performing efficient packet transfer in which packets traverse a reduced number of edge nodes 20.

Also, when determining whether or not to add one or more LOCs to a LOC request as above, the balance between efficient switchover during host movement and efficient packet transfer may be considered, and the management server 40 may determine to add, to the LOC list of the LOC request, only the LOCs of some edge nodes 20 to be traversed by packets from among the edge nodes 20 managed by that management server 40. The LOC request is then transmitted to another management server 40 positioned in a lower layer, in accordance with the destination host IP address.

(Method 1-2)

A management server 40 that has received a LOC request (i.e., one of the management servers 41 to 44 in the first embodiment) determines whether or not to add (store) the LOCs of one or more edge nodes 20 being managed by that management server 40 to a LOC reply that is to be transmitted in accordance with the destination host IP address included in the LOC request. In the case where efficient tunnel switchover during host movement is prioritized, the management server 40 determines to add one or more LOCs, stores the LOCs of the one or more edge nodes 20 being managed by that management server 40 in the LOC reply, and transmits the resulting LOC reply to a given edge node 20. Otherwise, the management server 40 determines not to add the one or more LOCs.

Also, when determining whether or not to add one or more LOCs to a LOC reply, the balance between efficient switchover during host movement and efficient packet transfer may be considered, and the management server 40 may determine to add, to the LOC reply, only the LOCs of some edge nodes 20 to be traversed by packets from among the edge nodes 20 managed by that management server 40.

(Method 1-3)

A LOC request received by a management server 40 (i.e., one of the management servers 41 to 44 in the first embodiment) may contain not only a destination host IP address, but also selection information, such as the source host IP address, protocol ID, or port number, for selecting whether to add all, some, or none of the one or more LOCs managed by that management server 40. Adding all, some, or none of the one or more LOCs is then determined on the basis of the selection information.

(Method 2-1)

An edge node 20 that has received a LOC reply storing a LOC list like that described in the first embodiment (i.e., one of the edge nodes 27, 26, and 25 in the first embodiment) determines which edge nodes 20 are to be traversed (or, which edge nodes 20 are to be bypassed when transferring packets), on the basis of the destination host IP address included in the LOC reply, or alternatively, on the basis of the results of a consideration of the balance between efficient switchover during host movement and efficient packet forwarding. In accordance with the determination results, for example, the edge node 20 removes the LOCs of one or more edge nodes 20 to be bypassed (i.e., edge nodes 20 that packets will not traverse) from the LOC list in the LOC reply. The LOC reply is then transferred to an upper layer edge node 20.

(Method 2-2)

A LOC reply received by an edge node 20 (i.e., one of the edge nodes 27, 26, and 25 in the first embodiment) may contain not only a destination host IP address, but also selection information, such as the source host IP address, protocol ID, or port number, for selecting edge nodes 20 to be traversed (or selecting nodes 20 to be bypassed) by packets from the LOC list stored in the LOC reply. For example, edge nodes 20 to be bypassed by packets are determined on the basis of the selection information, and the LOCs of the determined edge nodes 20 are removed from the LOC list in the LOC reply.

(Basis for Determination)

The determination of whether to add all, some, or none of one or more LOCs in the above methods 1-1, 1-2, 1-3, as well as the determination of whether to remove some or none of one or more LOCs in methods 2-1 and 2-2, may use one of the following as a basis for determination.

(1) Edge Node Congestion

Congestion at each of edge nodes 20 is monitored, and LOCs are added at management servers 40 and removed at edge nodes 20 such that corresponding edge nodes 20 are excluded according to the degree of congestion.

For example, congestion monitoring may be carried out by an edge node 20, a management server 40, or a dedicated monitoring server (i.e., monitoring PC; not illustrated). A configuration may be implemented in which monitoring results (information indicating the presence of edge node congestion, or congestion information) are notified to management servers 40 or edge nodes 20 using in-band or out-of-band communication at suitable timings.

Congestion information for an edge node 20 is acquired by the management server 40 managing that edge node 20. For example, congestion information for the edge node 25 is acquired by the management server 42. Congestion information acquired by a management server 40 is, for example, stored in the auxiliary storage (the HDD 83) of that management server 40. Congestion information may be stored in, for example, the host ID/LOC management table 90 included in a management server 40. For example, a storage area for storing flag information indicating whether or not congestion exists (e.g., a value "0" or "OFF" indicates no congestion, and a value "1" or "ON" indicates congestion) may be provided for an entry in the host ID/LOC management table 90.

When determining whether or not to add, to a LOC request, a LOC list stored in an entry found by searching the host ID/LOC management table 90, the CPU 81 of a management server 40 may add the LOC list to the LOC request when the flag information is set at value "OFF", and not add the LOC list to the LOC request when the flag information is set at value "ON". For cases where a plurality of LOCs are stored in an entry, a single flag representing the plurality of LOCs may be provided as the flag information indicating the presence of congestion, or a flag may be provided for each LOC. In the case of providing a flag for each LOC, some LOCs may be added when a portion of the flags are set at "ON" while another portion of the flags are set at "OFF".

Congestion information for an edge node 20 is notified to the edge node 20 that receives a LOC reply, or acquired by the edge node 20. For example, the edge node 27 may receive congestion information for the edge node 22 from the edge node 22, the management server 44, or a monitoring server. Meanwhile, congestion information for the edge node 27 may be obtained by monitoring the the edge node 27. For example, the congestion information may be stored in the storage 53 of an edge node 20.

Upon receiving a LOC reply, the CPU 51 of an edge node 20 references congestion information stored in the storage 53, and determines whether or not to remove some LOCs stored in the LOC reply. The congestion information stored in the storage 53 may indicate the state of congestion for each individual edge node 20, or may indicate a representative state of congestion for two or more edge nodes 20. The CPU 51 removes, from the LOC reply, one or more LOCs corresponding to the congestion information indicating that there exists congestion. Meanwhile, removing LOCs is not carried out when all congestion information indicates that there is no congestion.

It is also possible to configure a system such that an edge node 20 that first receives a LOC reply from a management server 40 (the edge node 27, for example) collects congestion information for all edge nodes 20 whose LOCs are stored in the LOC list in the LOC reply (the edge nodes 22, 27, 26, and 25, for example), and removes, from the LOC list, LOCs corresponding to congestion information indicating that congestion exists. In this case, in the edge nodes 26 and 25 positioned above the edge node 27, processing for determination of removing LOCs (except for LOCs used for establishing a tunnel) may be omitted.

(2) Frequency of Host Movement

In cases where a host (for example, the host 32 in FIG. 1) frequently switches to a different egress edge node (i.e., moves to another access network), avoiding the addition of LOCs to LOC requests and removing LOCs from LOC requests may not be executed. The frequency of host movement may be acquired using a variety of known techniques. For example, the edge nodes 22, 23, and 24 corresponding to last edges may use ping messages to monitor the connection state of the host 32 identified by the IP address "Host IP2". The monitoring results may then be aggregated to create information indicating a movement frequency (such as high or low), and the movement frequency information may then be set in a given management server 40 or edge node 20 (for example, stored in the storage 53 or HDD 83).

In this case, a management server 40 avoids the addition of LOCs when "low" is set for "Host IP2" as the movement frequency information, and adds LOCs when "high" is set for "Host IP2" as the movement frequency information. Further, an edge node 20 removes LOCs when "low" is set for "Host IP2" as the movement frequency information, and avoids removing LOCs when "high" is set for "Host IP2" as the movement frequency information. As a result, a packet transfer route traversing many edge nodes 20 may be applied for hosts having "high" movement frequency, thereby shortening tunnel switchover when a host moves. Meanwhile, the number of traversed edge nodes 20 may be reduced for hosts having "low" movement frequency.

(3) Parameters Included in a LOC Request and a LOC Reply

As illustrated in methods 1-3 and 2-2, it is possible for LOC requests and LOC replies to include selection information storing a plurality of parameters such as the source host IP address, protocol ID, and port number.

For example, one of first and second setting may be applied for a specific destination host IP address in reflection of various circumstances such as the movement frequency. Here, the first setting means that the bypassing of edge nodes 20 is disabled, that is, the adding of LOCs is not avoided and the removing LOCs is not performed for the specific destination host IP address, and the second setting means that the bypassing of some edge nodes 20 is enabled. Alternatively, it may be determined whether to apply the above first setting or second setting to a specific packet flow which is identified by a source IP address and a destination IP address.

Further, it may be determined that the first setting is applied for applications demanding quick tunnel switchover (such applications being identified by protocol ID and port number), and the second setting is applied for applications allowing some leeway with tunnel switchover.

Alternatively, it may also be determined whether to apply the first setting or the second setting according to a combination of the above plurality of parameters (such as packet flow and application). With the second setting, the edge nodes 20 to be bypassed may be determined as appropriate.

The determination and processing to avoid the addition of LOCs as above may be performed by the CPU 81 of a management server 40. Information for determining whether or not to avoid the addition of LOCs may be stored in auxiliary storage such as the HDD 83 of a management server 40. The determination and processing to remove LOCs may be performed by the CPU 51 of an edge node 20. Information for determining whether or not to remove LOCs may be stored in the storage 53.

(Processes Performed by a Management Server and an Edge Node in the Third Embodiment)

Hereinafter, exemplary processes performed by management servers 40 and edge nodes 20 in the third embodiment will be described. The configurations of the network system, the management servers 41 to 44, and the edge nodes 20 (i.e., the edge nodes 21 to 29) according to the third embodiment are similar to those of the first embodiment (see FIGS. 1 to 9). However, in the third embodiment, the processes respectively executed by the management servers 41 to 44 and the edge nodes (i.e., the edge nodes 21 to 29) differs from those of the first embodiment, in consideration of the above methods 1-1 to 2-2.

Figure 31:
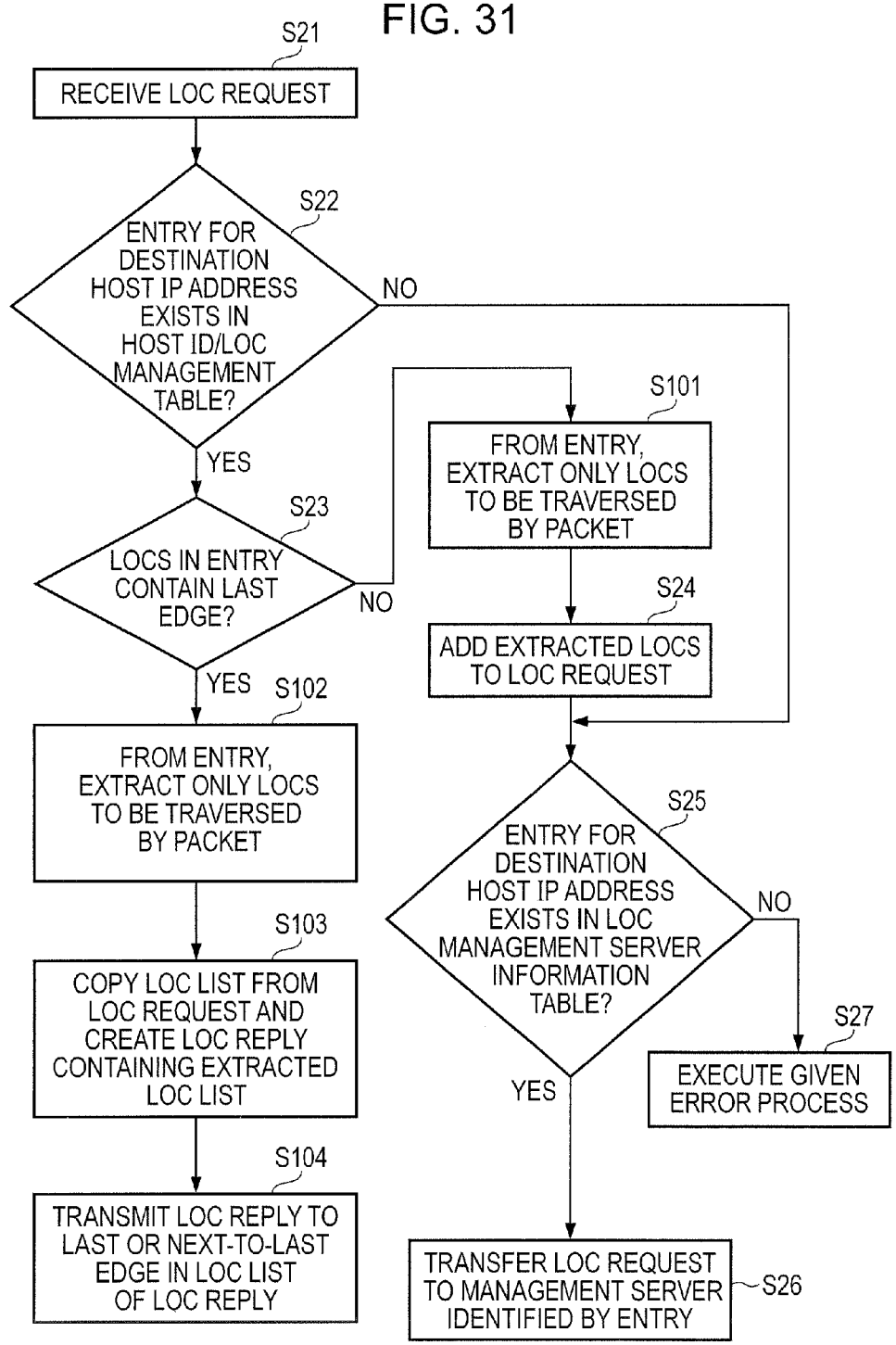
FIG. 31 is a diagram illustrating an example of an operational flowchart for a process performed by a management server, according to a third embodiment.

FIG. 31 is a diagram illustrating an example of an operational flowchart for a process performed by a management server, according to a third embodiment. FIG. 31 illustrates an example of a process performed, for example, by the management servers 41 to 44 in the third embodiment. Since the process in operations S21 to S23 in the flowchart illustrated in FIG. 31 is similar to the process performed by a management server 40 in the first embodiment (see FIG. 18), further description thereof will be omitted here.

In operation S23, the process proceeds to S101 when the last-edge information indicates "No" in an entry found by searching the host ID/LOC management table 90 (NO in operation S23).

In operation S101, the management server 40 extracts, from the LOC list included in the found entry, only the LOCs to be traversed by packets during packet transfer. Extraction is conducted according to the basis for determination discussed earlier.

In operation S24, only the extracted LOCs are added to the LOC list of a LOC request. In some cases, any LOCs may not be extracted in operation S101. In such cases, LOCs are not added in operation S24.

The subsequent process in operations S25 to S27 is similar to that of the first embodiment, and thus description thereof is herein omitted.

In operation S23, the process proceeds to S102 when the last-edge information indicates "Yes" in an entry found by searching the host ID/LOC management table 90 (YES in operation S23).

In operation S102, a process similar to S101 is executed.

In operation S103, the management server 40 creates a LOC reply that stores the LOCs extracted in operation S102 as well as the LOCs stored in the LOC list included in the LOC request.

In operation S104, the management server 40 transmits the created LOC reply to the edge node 20 having a LOC positioned last in the LOC list of the LOC reply, or to the edge node 20 having a LOC positioned next to the last in the LOC list.

Figure 32:
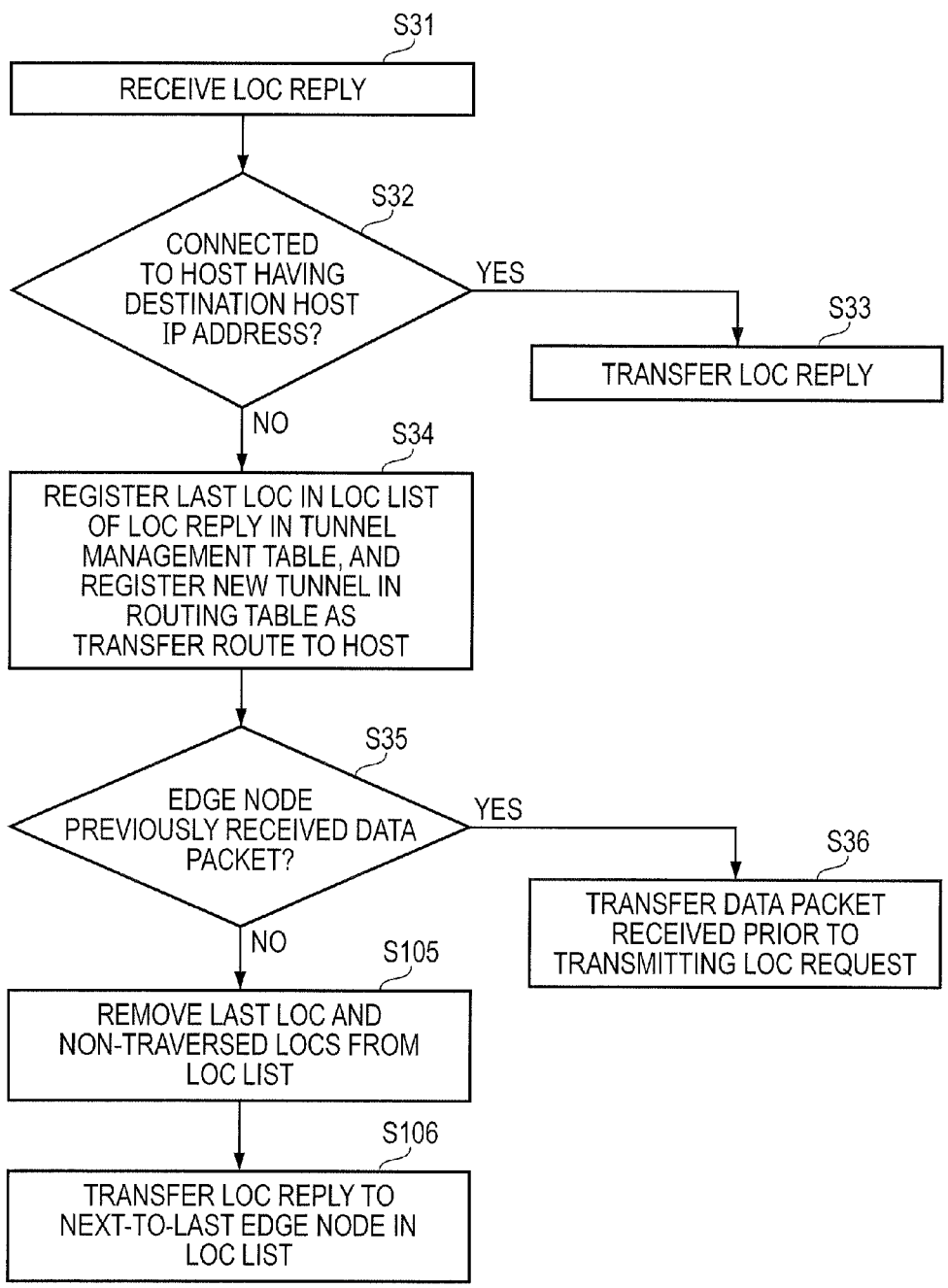
FIG. 32 is a diagram illustrating an example of an operational flowchart for a process performed by an edge node, according to a third embodiment.

FIG. 32 is a diagram illustrating an example of an operational flowchart for a process performed by an edge node, according to a third embodiment. FIG. 32 illustrates processing performed by an edge node 20 that has received a LOC reply. Since the process in operations S31 to S35 and S36 in FIG. 32 is similar to that of the first embodiment (see FIG. 19), further description thereof will be omitted here.

In operation S35, the process proceeds to S105 when the edge node 20 that has received the LOC reply is not the edge node 20 that previously received a packet from the host.

In operation S105, the LOC positioned last in the LOC list is removed from the LOC list in the LOC reply, in a manner similar to the first embodiment. Further, the edge node 20 extracts the LOCs of edge nodes 20 that are not to be traversed by the packet transfer route (i.e., non-traversed LOCs identifying edge nodes 20 that are to be bypassed) from the LOC list of the LOC reply, according to the basis for determination discussed earlier. The extracted LOCs are removed from the LOC reply. However, LOCs are not removed when there are no LOCs to be extracted in consideration of the basis for determination.

In operation S106, the edge node 20 transfers the LOC reply to the edge node 20 having the next-to-last LOC stored in the LOC list in the LOC reply.

<Operational Examples>

Hereinafter, operational examples of the third embodiment will be described.

(Operational Example 1)

Operational example 1 according to the third embodiment assumes the case of initiating communication between a host 31 and a host 32 in a manner similar to the operational example 1 according to the first embodiment. Further, it is herein assumed that packet transfer to the host 32 ("Host IP2") is conducted in an environment that does not demand the prioritization of efficient tunnel switchover when a host moves. Furthermore assume that information, which is used for determining that a LOC stored in the host ID/LOC management table 90 of the management server 43 (i.e., LOC6) is not to be added to a LOC request, has been statically or dynamically set in the management server 43.

In this case, in phase 5 (phases 1 to 4 are the same as those in the first embodiment), the management server 43 transmits a LOC request to the next management server 44 without adding the LOC of the edge node 20 managed by the management server 43 (i.e., LOC6) to the LOC list of the LOC request.

In phase 6, upon receiving a LOC request, the management server 44 processes the received LOC request in a manner similar to the first embodiment, and transmits a LOC reply to the edge node 27. In this case, the LOC list of the LOC reply contains LOC5, LOC1, and LOC2.

In phase 7, the edge node 27 establish a tunnel to the edge node 22 using LOC2 stored in the LOC reply. The edge node 27, after removing LOC2 from the LOC reply, transmits the LOC reply to the edge node 25 rather than the edge node 26. Consequently, phase 8 is skipped, and phase 9 is carried out. This allows the edge node 25 to establish a tunnel to the edge node 27 that bypasses the edge node 26. Phases 9 and 10 are performed in a manner similar to those of the first embodiment. Thus, series-connected tunnels that bypass the edge node 26 may be constructed.

(Operational Example 2)

Operational example 2 assumes the case of initiating communication between a host 31 and a host 32 in a manner similar to the operational example 1 according to the first embodiment. Further, it is assumed that packet transfer to the host 32 ("Host IP2") is conducted in an environment that does not demand the prioritization of efficient tunnel switchover when a host moves. Furthermore assume that a setting for removing a given LOC from the LOC list of a LOC reply (such as LOC6) has been statically or dynamically set in the edge node 27.

In this case, the phases 1 to 6 in the first embodiment are carried out, and the edge node 27 receives a LOC reply from the management server 44. In the phase 7, the edge node 27 establishes a tunnel to the edge node 22 and removes LOC2 from the LOC reply. Further, the edge node 27 removes LOC6 from the LOC reply, in accordance with the above setting. Subsequent operations are similar to the operational example 1 in the third embodiment. Finally, series-connected tunnels bypassing the edge node 26 are established and used for packet transfer from the host 31 to the host 32.

According to the third embodiment, by setting information in at least one of the management servers 40 and edge nodes 20 in the first embodiment such that LOCs are not added to LOC requests or such that LOCs are removed from LOC replies, it is possible to construct a packet transfer route (i.e., series-connected tunnels) that bypasses a desired edge node 20.

Although the above operational examples 1 and 2 describe examples in which adding LOCs is avoided and removing LOCs is executed by one of a plurality of management servers 40 and a plurality of edge nodes 20, it is also possible that adding LOCs is avoided and removing LOCs is executed by several management servers 40 and edge nodes 20. The operative management servers 40 and edge nodes 20 may be set as appropriate.

(Fourth Embodiment)

Next, description will be given of a fourth embodiment. Since the fourth embodiment shares some features in common with the first through third embodiments, the differences will be primarily described, and detailed description of the shared features will be reduced or omitted here.

Figure 33:
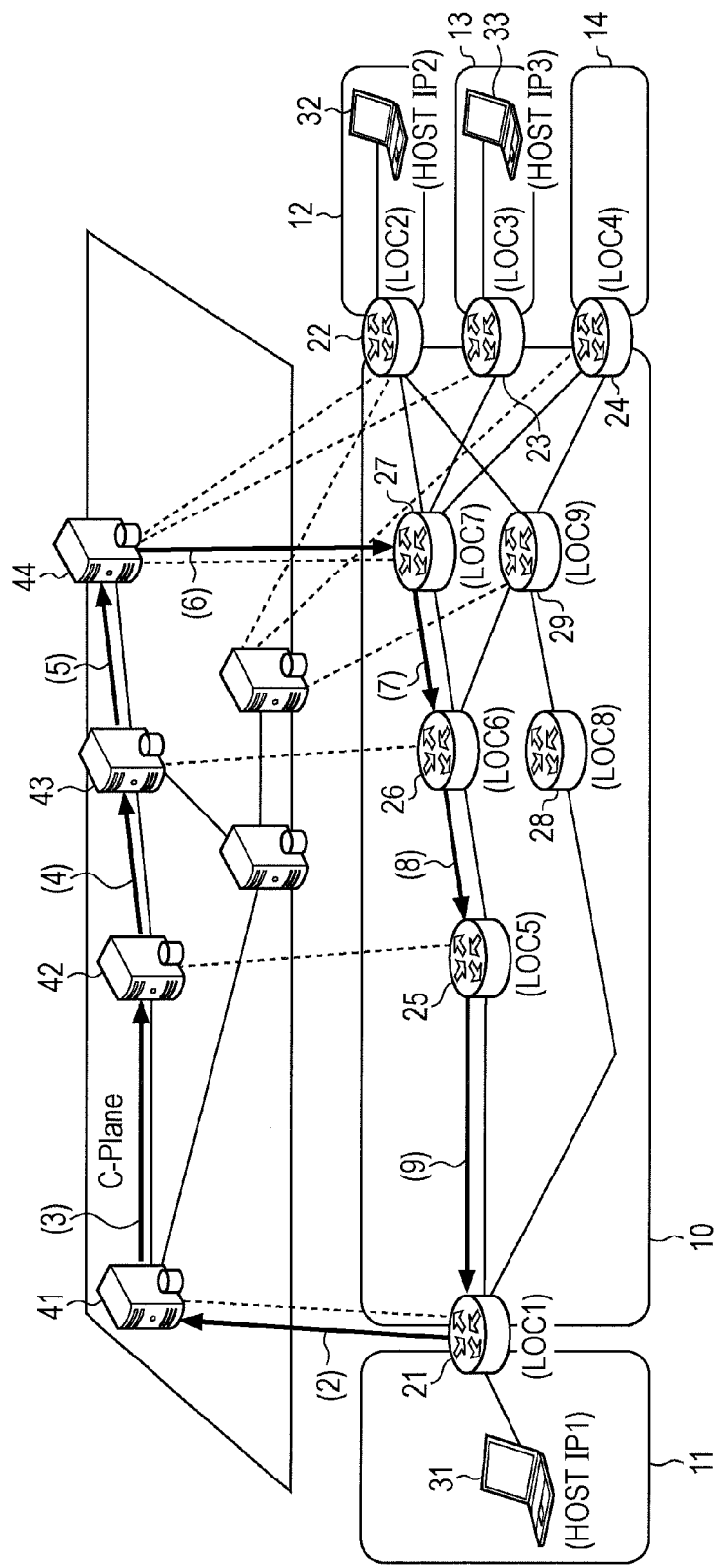
FIG. 33 is a diagram illustrating an example of a network system, according to a fourth embodiment.

FIG. 33 is a diagram illustrating an example of a network system, according to a fourth embodiment. As illustrated in FIG. 33, the network system according to the fourth embodiment differs from the network system according to the first embodiment (see FIG. 1) in that the plurality of edge nodes 20 included in the core network 10 (in FIG. 33, the edge nodes 21 to 29) are connected in a mesh topology.

When a host 31 transmits a packet addressed to a host 32 ("Host IP2") to the edge node 21 so as to communicate with the host 32 in the above mentioned network system, operations and processes similar to the operational example 1 in the first embodiment are performed, and series-connected tunnels traversing the edge nodes 25, 26, and 27 may be established between the ingress edge node 21 and the egress edge node 22.

According to the fourth embodiment, it is possible to reduce the processing load at respective edge nodes 20 and respective management servers 40 when establishing series-connected tunnels coupling hosts over the core network 10 in a manner similar to at least the operational example 1 in the first embodiment. Moreover, a decrease in the time needed for establishing series-connected tunnels may be anticipated. The configuration of the fourth embodiment and the configurations described in the second and third embodiments may also be combined as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system for establishing tunnels between nodes along a packet transfer route in a communication network, the system comprising:
    a plurality of relay nodes including first and second relay nodes and one or more intermediate relay nodes via which a first packet is to be transferred along the packet transfer route, the first relay node receiving the first packet including a destination address, the second relay node being communicably coupled to a first terminal identified by the destination address included in the first packet; and
    a plurality of management servers including a first management server managing the first relay node and a second management server managing the second relay node, wherein
    the first relay node is configured to transmit a request message including the destination address to the first management server so as to resolve relay-node addresses used for transferring the first packet;
    the plurality of management servers transfer, from the first management server to the second management server, the request message based on transfer control information that is held in each of the plurality of management servers in association with the destination address, while storing, in the request message, a first list of relay-node addresses identifying relay nodes, included in the plurality of relay nodes, via which the first packet is to be transferred;
    the second management server, upon receiving the request message, creates a reply message including a second list of relay-node addresses that respectively identify the first relay node, the one or more intermediate relay nodes via which the first packet is to be transferred, and the second relay node, the second list being generated by adding, to the first list, at least one relay-node address held in the second management server, the at least one relay-node address including a relay-node address identifying the second relay node;
    two or more relay nodes other than the second relay node, whose relay-node addresses are stored in the second list of relay-node addresses, are each configured to:
        receive the reply message,
        establish, for the destination address, a first tunnel used for transferring the first packet between a pair of relay nodes included in the two or more relay nodes, in association with one of the second list of relay-node addresses included in the received reply message,
        update the second list by removing, from the second list, at least one relay-node address including the one of the second list of relay-node addresses that is associated with the established first tunnel, and
        transfer, when at least one relay-node address remains in the updated second list, the reply message including the updated second list to a relay node identified by one of the at least one relay-node address remaining in the updated second list; and
    when the first packet is outputted from one of the two or more relay nodes via the established first tunnel, the first packet is encapsulated with a header that stores, as a destination address, a relay-node address associated with the established first tunnel.

2. The system of claim 1, wherein
under a condition that a plurality of the first tunnels are established so as to form series-connected tunnels in which the plurality of the first tunnels are in series connected to each other along the packet transfer route of the first packet, when the first relay node receives a second packet addressed to a second terminal communicably coupled to a third relay node included in the plurality of relay nodes, a fourth relay node included in the two or more relay nodes establishes a second tunnel coupling the third and fourth relay nodes; and
the second packet is transferred from the first relay node to the fourth relay node using the series-connected tunnels established along the packet transfer route of the first packet from the first relay node to the fourth relay node, and transferred from the fourth relay node to the third relay node using the second tunnel.

3. The system of claim 1, wherein
under a condition that a plurality of the first tunnels are established so as to form series-connected tunnels in which the plurality of the first tunnels are in series connected to each other along the packet transfer route of the first packet, when communication between the first terminal and the second relay node is disconnected and the first terminal is communicably coupled to a third relay node included in the plurality of relay nodes, a fourth relay node included in the two or more relay nodes establishes a second tunnel coupling the third and fourth relay nodes; and the first packet is transferred from the first relay node to the fourth relay node using the series-connected tunnels established along the packet transfer route of the first packet from the first relay node to the fourth relay node, and transferred from the fourth relay node to the third relay node using the second tunnel.

4. The system of claim 1, wherein
the first management server is configured to:
hold a first management server address to which the request message is to be transferred, in association with the destination address, and
transfer the request message to the management server address; and
one or more management servers other than the first management server are each configured to:
hold a second management server address to which the request message is to be transferred, in association with the destination address,
hold one or more relay-node addresses that are to be stored in the request message, and
hold information identifying whether the each management server is the second management server or not, wherein
when the each management server is not the second management server, the each management server, upon receiving the request message, updates the received request message by adding the one or more relay-node addresses to the received request message, and transfers the updated request message to a management server identified by the second management server address; and
when the each management server is the second management server, the each management server, upon receiving the request message, creates the reply message and transmits the created reply message.

5. The system of claim 1, wherein
each of the two or more relay nodes, upon receiving the reply message, stores one of one or more relay-node addresses stored in the reply message and identifier information identifying a tunnel, in association with the destination address; and
the each relay node, upon receiving the first packet, transmits a packet generated by encapsulating the first packet to the first tunnel associated with the destination address included in the received first packet.

6. The system of claim 2, wherein
under a condition that the plurality of relay nodes are communicably coupled with each other in a tree topology that includes, as a root, a predetermined relay node positioned on the packet transfer route for transferring the first packet; the second relay node and a third relay node are positioned at a leaf layer in the tree topology; and the tunnel is established between each pair of adjacent relay nodes that are included in the two or more relay nodes and positioned along the packet transfer route of the first packet,
when the a second terminal communicably coupled to the third relay node transmits a second packet to the first terminal, a fourth relay node positioned between the predetermined relay node and the second relay node along the packet transfer route of the first packet establishes a third tunnel between the fourth and third relay nodes, and transfers the second packet arriving via the third tunnel from the third relay node to the first tunnel established between the fourth relay node and the second relay node along the packet transfer route of the first packet.

7. The system of claim 4, wherein
at least one of the one or more management servers other than the first management server holds determination information for determining whether the one or more relay-node addresses is to be stored in the request message or not; and
the at least one of the one or more management servers other than the first management server adds a part, all, or none of the one or more relay-node addresses into the request message, based on the determination information.

8. The system of claim 1, wherein
at least one of the plurality of relay nodes other than the second relay node holds determination information for determining whether a predetermined set of relay-node addresses are to be removed from the reply message or not; and
the at least one of the plurality of relay nodes other than the second relay node removes the predetermined set of relay-node addresses based on the determination information.

9. The system of claim 1, wherein
the second list of relay-node addresses are arranged in the order of arrangement of the corresponding relay nodes along the packet transfer route of the first packet from the first relay node to the second relay node;
the reply message is transmitted from the second management server to a third relay node that is positioned one hop before the second relay node along the packet transfer route; and
the reply message is transferred from the third relay node to one or more relay nodes identified by the second list included in the reply message, in the opposite direction from transferring the first packet.

10. The system of claim 1, wherein
the second list of relay-node addresses are arranged in the order of arrangement of the corresponding relay nodes along the packet transfer route of the first packet from the first relay node to the second relay node;
the reply message is transmitted from the second management server to the second relay node;
the second relay node transfers the replay message to a third relay node that is positioned one hop before the second relay node along the packet transfer route; and
the reply message is transferred from the third relay node to the first relay node to one or more relay nodes identified by the second list included in the reply message, in the opposite direction from transferring the first packet.

11. A method for establishing tunnels between nodes along a packet transfer route in a communication network including a plurality of relay nodes and a plurality of management servers, the plurality of relay nodes including first and second relay nodes and one or more intermediate relay nodes via which a packet is to be transferred along the packet transfer route, the first relay node receiving the first packet including a destination address, the second relay node being communicably coupled to a terminal identified by the destination address included in the first packet, the plurality of management servers including a first management server managing the first relay node and a second management server managing the second relay node, the method comprising:
transmitting, by the first relay node, a request message including the destination address to the first management server so as to resolve relay-node addresses used for transferring the packet;
transferring, by the plurality of management servers, the request message from the first management server to the second management server, based on transfer control information that is held in each of the plurality of management servers in association with the destination address, while storing, in the request message, a first list of relay-node addresses identifying relay nodes, included in the plurality of relay nodes, via which the packet is to be transferred;

creating, by the second management apparatus, a reply message including a second list of relay-node addresses that respectively identify the first relay node, the one or more intermediate relay nodes via which the packet is to be transferred, and the second relay node, the second list being generated by adding, to the first list, at least one relay-node addresses held in the second management apparatus, the at least one relay-node address including a relay-node address identifying the second relay node;

performing, by each of two or more relay nodes other than the second relay node whose relay-node addresses are stored in the second list of relay-node addresses, a procedure including:

receiving the reply message, establishing, for the destination address, a tunnel used for transferring the packet between a pair of relay nodes included in the two or more relay nodes, in association with one of the second list of relay-node addresses included in the received reply message, updating the second list by removing, from the second list, at least one relay-node address including the one of the second list of relay-node address that is associated with the established tunnel, and transferring, when at least one relay-node address remains in the updated second list, the reply message including the updated second list to a relay node identified by one of the at least one relay-node addresses remaining in the updated second list; and when the packet is outputted from one of the two or more relay nodes via the established tunnel, encapsulating, by each of the two or more relay nodes, the packet with a header that stores, as a destination address, a relay-node address associated with the established tunnel.

* * * * *

UNITED STATES PATENT AND TRADEMARK OFFICE
CERTIFICATE OF CORRECTION

| | | |
|---|---|---|
| PATENT NO. | : 8,942,238 B2 | Page 1 of 1 |
| APPLICATION NO. | : 13/599050 | |
| DATED | : January 27, 2015 | |
| INVENTOR(S) | : Shinya Kano | |

It is certified that error appears in the above-identified patent and that said Letters Patent is hereby corrected as shown below:

In the Claims

Column 33, Line 57, In Claim 6, delete "the a second" and insert -- the second --, therefor.

Signed and Sealed this
Fifth Day of May, 2015

Michelle K. Lee
*Director of the United States Patent and Trademark Office*